US012163427B2

(12) United States Patent
Moeny

(10) Patent No.: US 12,163,427 B2
(45) Date of Patent: *Dec. 10, 2024

(54) DRILL BIT FOR DOWNHOLE ELECTROCRUSHING DRILLING

(71) Applicants: Halliburton Energy Services, Inc., Houston, TX (US); Chevron U.S.A. Inc., San Ramon, CA (US); SDG LLC, Minden, NV (US)

(72) Inventor: William M. Moeny, Bernalillo, NM (US)

(73) Assignees: Halliburton Energy Services, Inc., Houston, TX (US); Chevron U.S.A. Inc., San Ramon, CA (US); SDG LLC, Minden, NV (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/340,709

(22) Filed: Jun. 23, 2023

(65) Prior Publication Data

US 2023/0332470 A1 Oct. 19, 2023

Related U.S. Application Data

(60) Continuation of application No. 17/971,878, filed on Oct. 24, 2022, now abandoned, which is a division of (Continued)

(51) Int. Cl.
*E21B 7/15* (2006.01)
*B02C 19/18* (2006.01)
(Continued)

(52) U.S. Cl.
CPC ................ *E21B 7/15* (2013.01); *E21B 10/00* (2013.01); *E21B 10/60* (2013.01); *E21C 37/18* (2013.01); *B02C 2019/183* (2013.01)

(58) Field of Classification Search
CPC . E21B 7/15; E21B 10/00; E21B 10/60; E21B 41/0085; E21C 37/18; B02C 2019/183
See application file for complete search history.

(56) References Cited

U.S. PATENT DOCUMENTS 11,480,015 B2 10/2022 Moeny
2005/0150688 A1 7/2005 MacGregor et al.
(Continued)

FOREIGN PATENT DOCUMENTS

KR 0169204 1/1999
WO 2014100255 6/2014
WO WO-2014100255 A1 * 6/2014 ............. E21B 10/00

OTHER PUBLICATIONS

"BR Application No. 112019012395, First Official Action", May 31, 2022, 4 pages.
(Continued)

*Primary Examiner* — George S Gray
(74) *Attorney, Agent, or Firm* — DeLizio, Peacock, Lewin & Guerra, LLP

(57) ABSTRACT

An electrocrushing drill bit comprises a bit body and at least one electrode coupled to a power source and the bit body, wherein the at least one electrode having a distal portion for engaging with a surface of a wellbore. The electrocrushing drill bit comprises a ground structure coupled to the bit body proximate to the at least one electrode and having a distal portion for engaging with the surface of the wellbore, wherein the ground structure comprises a transverse ground structure.

41 Claims, 14 Drawing Sheets

Related U.S. Application Data application No. 17/108,765, filed on Dec. 1, 2020, now Pat. No. 11,480,015, which is a division of application No. 16/074,595, filed as application No. PCT/US2017/013740 on Jan. 17, 2017, now Pat. No. 10,961,782.

(51) Int. Cl.

| | |
|---|---|
| ***E21B 10/00*** | (2006.01) |
| ***E21B 10/60*** | (2006.01) |
| ***E21C 37/18*** | (2006.01) |

(56) References Cited

U.S. PATENT DOCUMENTS

| | | | |
|---|---|---|---|
| 2009/0133929 | A1 | 5/2009 | Rodland |
| 2010/0212962 | A1 | 8/2010 | Rosten et al. |
| 2013/0032397 | A1 | 2/2013 | Dirksen |
| 2013/0032399 | A1 | 2/2013 | Dirksen |
| 2016/0017663 | A1 | 1/2016 | Moeny |
| 2017/0067292 | A1 | 3/2017 | Bayol et al. |
| 2023/0124575 | A1 | 4/2023 | Moeny |

OTHER PUBLICATIONS

"U.S. Appl. No. 17/108,765, Non-Final Office Action", Feb. 9, 2022, 16 pages.

"U.S. Appl. No. 17/971,878, Non-Final Office Action", Mar. 16, 2023, 20 pages.

* cited by examiner

DRILL BIT FOR DOWNHOLE ELECTROCRUSHING DRILLING

TECHNICAL FIELD

The present disclosure relates generally to downhole electrocrushing drilling and, more particularly, to drill bits used in downhole electrocrushing drilling.

BACKGROUND

Electrocrushing drilling uses pulsed power technology to drill a borehole in a rock formation. Pulsed power technology repeatedly applies a high electric potential across the electrodes of an electrocrushing drill bit, which ultimately causes the surrounding rock to fracture. The fractured rock is carried away from the bit by drilling fluid and the bit advances downhole.

BRIEF DESCRIPTION OF THE DRAWINGS

For a more complete understanding of the present disclosure and its features and advantages, reference is now made to the following description, taken in conjunction with the accompanying drawings, in which.

DETAILED DESCRIPTION

Electrocrushing drilling may be used to form wellbores in subterranean rock formations for recovering hydrocarbons, such as oil and gas, from these formations. Electrocrushing drilling uses pulsed-power technology to repeatedly fracture the rock formation by repeatedly delivering high-energy electrical pulses to the rock formation. A drill bit used for electrocrushing drilling includes an electrode and a ground ring coupled to a power source. The electrode and ground ring have contours designed to enhance, concentrate, or otherwise manage the electric field surrounding the drill bit. The electrode and ground ring also have fluid flow ports and openings to facilitate the flow of electrocrushing drilling fluid into and out of the drilling field. During a drilling operation, the electric field surrounding the drill bit is such that an arc forms and spans the electrode and the ground ring and penetrates the rock formation. The electrocrushing drilling fluid insulates the components of the drill bit and removes rock cuttings from the drilling field. As such, an electrocrushing drill bit designed according to the present disclosure may provide for more efficient drilling and removal of cuttings during the drilling operation.

There are numerous ways in which electrocrushing drill bits may be implemented in a downhole electrocrushing pulsed-power system. Thus, embodiments of the present disclosure and its advantages are best understood by referring to FIGS. 1 through 7, where like numbers are used to indicate like and corresponding parts.

Figure 1:
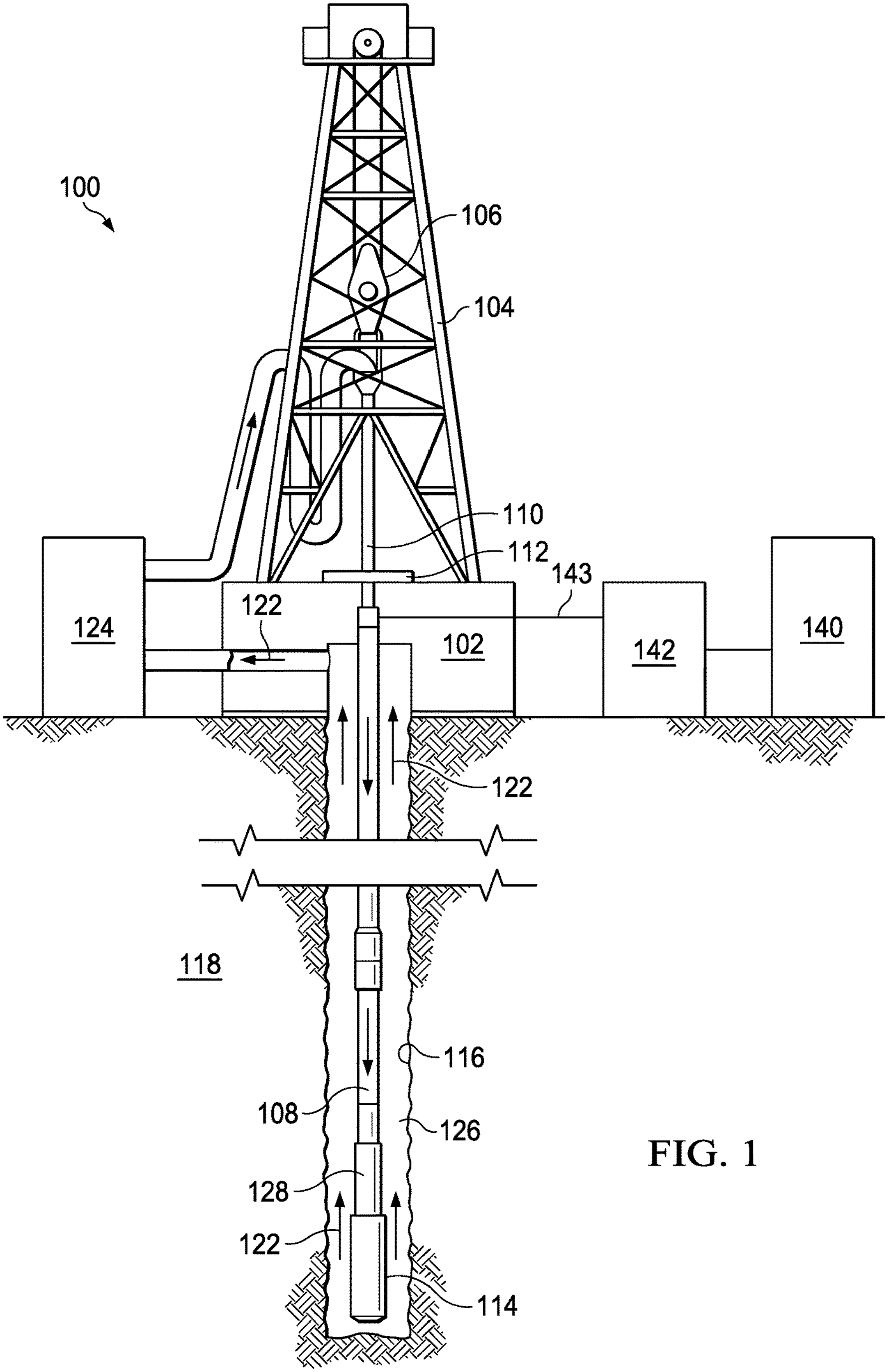
FIG. 1 is an elevation view of an exemplary downhole electrocrushing drilling system used in a wellbore environment.

FIG. 1 is an elevation view of an exemplary electrocrushing drilling system used to form a wellbore in a subterranean formation. Although FIG. 1 shows land-based equipment, downhole tools incorporating teachings of the present disclosure may be satisfactorily used with equipment located on offshore platforms, drill ships, semi-submersibles, and drilling barges (not expressly shown). Additionally, while wellbore 116 is shown as being a generally vertical wellbore, wellbore 116 may be any orientation including generally horizontal, multilateral, or directional.

Drilling system 100 includes drilling platform 102 that supports derrick 104 having traveling block 106 for raising and lowering drill string 108. Drilling system 100 also includes pump 124, which circulates electrocrushing drilling fluid 122 through a feed pipe to drill string 110, which in turn conveys electrocrushing drilling fluid 122 downhole through interior channels of drill string 108 and through one or more orifices in electrocrushing drill bit 114. Electrocrushing drilling fluid 122 then circulates back to the surface via annulus 126 formed between drill string 108 and the sidewalls of wellbore 116. Fractured portions of the formation are carried to the surface by electrocrushing drilling fluid 122 to remove those fractured portions from wellbore 116.

Electrocrushing drill bit 114 is attached to the distal end of drill string 108. In some embodiments, power to electrocrushing drill bit 114 may be supplied from the surface. For example, generator 140 may generate electrical power and provide that power to power-conditioning unit 142. Power-conditioning unit 142 may then transmit electrical energy downhole via surface cable 143 and a sub-surface cable (not expressly shown in FIG. 1) contained within drill string 108 or attached to the side of drill string 108. A pulse-generating circuit within bottom-hole assembly (BHA) 128 may receive the electrical energy from power-conditioning unit 142, and may generate high-energy pulses to drive electrocrushing drill bit 114.

The pulse-generating circuit within BHA 128 may be utilized to repeatedly apply a high electric potential, for example up to or exceeding 150 kV, across the electrodes of electrocrushing drill bit 114. Each application of electric potential may be referred to as a pulse. When the electric potential across the electrodes of electrocrushing drill bit 114 is increased enough during a pulse to generate a sufficiently high electric field, an electrical arc forms through a rock formation at the bottom of wellbore 116. The arc temporarily forms an electrical coupling between the electrodes of electrocrushing drill bit 114, allowing electric current to flow through the arc inside a portion of the rock formation at the bottom of wellbore 116. The arc greatly increases the temperature and pressure of the portion of the rock formation through which the arc flows and the surrounding formation and materials. The temperature and pressure are sufficiently high to break the rock itself into small bits or cuttings. This fractured rock is removed, typically by electrocrushing drilling fluid 122, which moves the fractured rock away from the electrodes and uphole.

As electrocrushing drill bit 114 repeatedly fractures the rock formation and electrocrushing drilling fluid 122 moves the fractured rock uphole, wellbore 116, which penetrates various subterranean rock formations 118, is created. Wellbore 116 may be any hole drilled into a subterranean formation or series of subterranean formations for the purpose of exploration or extraction of natural resources such as, for example, hydrocarbons, or for the purpose of injection of fluids such as, for example, water, wastewater, brine, or water mixed with other fluids. Additionally, wellbore 116 may be any hole drilled into a subterranean formation or series of subterranean formations for the purpose of geothermal power generation.

Although drilling system 100 is described herein as utilizing electrocrushing drill bit 114, drilling system 100 may also utilize an electrohydraulic drill bit. An electrohydraulic drill bit may have one or more electrodes and ground ring similar to electrocrushing drill bit 114. But, rather than generating an arc within the rock, an electrohydraulic drill bit applies a large electrical potential across the one or more electrodes and ground ring to form an arc across the drilling fluid proximate the bottom of wellbore 116. The high temperature of the arc vaporizes the portion of the fluid immediately surrounding the arc, which in turn generates a high-energy shock wave in the remaining fluid. The one or more electrodes of electrohydraulic drill bit may be oriented such that the shock wave generated by the arc is transmitted toward the bottom of wellbore 116. When the shock wave hits and bounces off of the rock at the bottom of wellbore 116, the rock fractures. Accordingly, drilling system 100 may utilize pulsed-power technology with an electrohydraulic drill bit to drill wellbore 116 in subterranean formation 118 in a similar manner as with electrocrushing drill bit 114.

Figure 2:
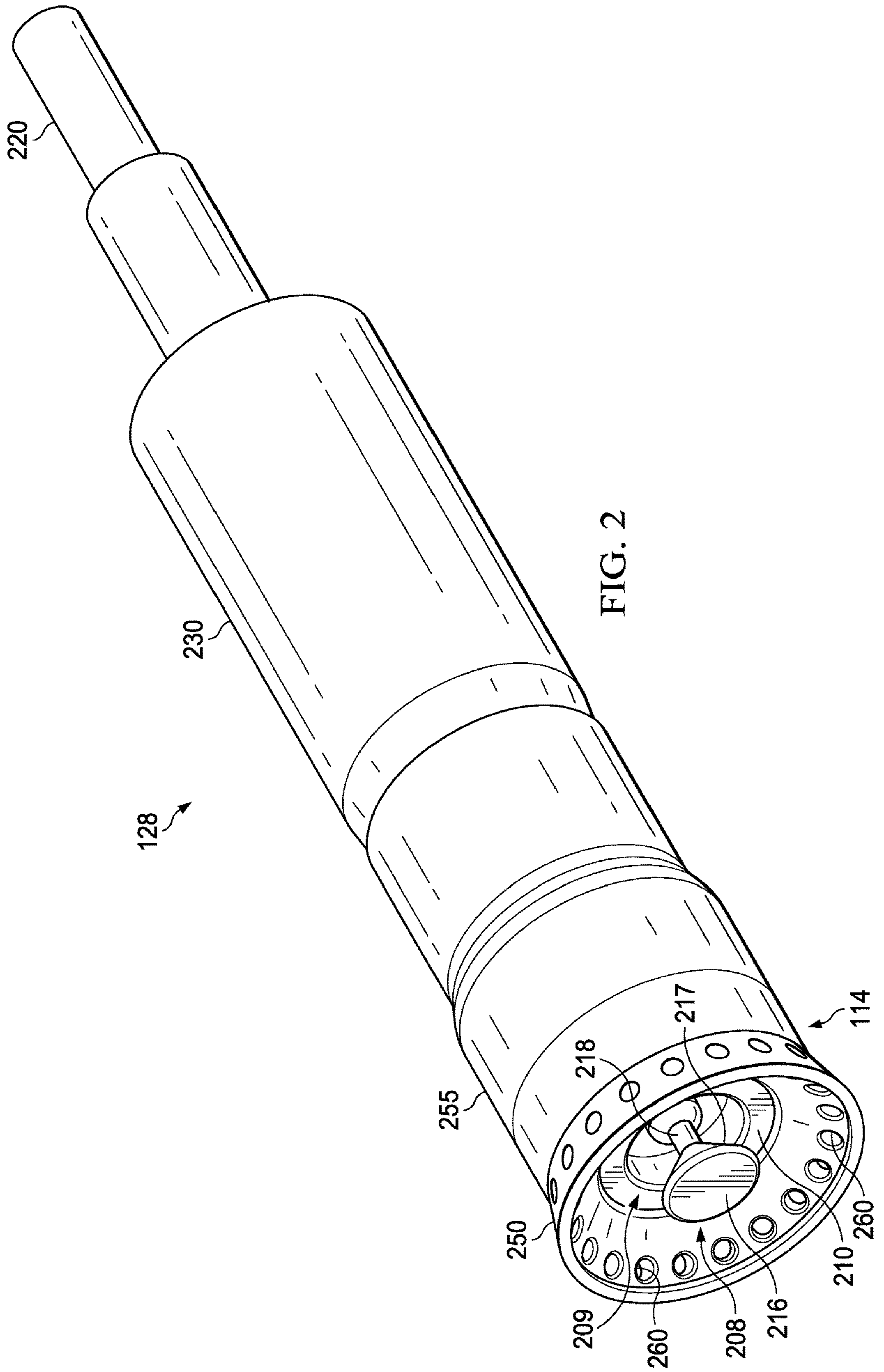
FIG. 2 is a perspective view of exemplary components of a bottom hole assembly for a downhole electrocrushing drilling system.

FIG. 2 is a perspective view of exemplary components of the bottom hole assembly for downhole electrocrushing drilling system 100. Bottom-hole assembly (BHA) 128 may include pulsed-power tool 230. BHA 128 may also include electrocrushing drill bit 114. For the purposes of the present disclosure, electrocrushing drill bit 114 may be integrated within BHA 128, or may be a separate component that is coupled to BHA 128.

Pulsed-power tool 230 may be coupled to provide pulsed electrical energy to electrocrushing drill bit 114. Pulsed-power tool 230 receives electrical power from a power source via cable 220. For example, pulsed-power tool 230 may receive electrical power via cable 220 from a power source on the surface as described above with reference to FIG. 1, or from a power source located downhole such as a generator powered by a mud turbine. Pulsed-power tool 230 may also receive electrical power via a combination of a power source on the surface and a power source located downhole. Pulsed-power tool 230 converts the electrical power received from the power source into high-energy electrical pulses that are applied across electrode 208 and ground ring 250 of electrocrushing drill bit 114.

Referring to FIG. 1 and FIG. 2, electrocrushing drilling fluid 122 may exit drill string 108 via opening 209 surrounding electrode 208. The flow of electrocrushing drill fluid 122 out of opening 209 allows electrode 208 to be insulated by the electrocrushing drilling fluid. While one electrode 208 is shown in FIG. 2, electrocrushing drill bit 114 may include multiple electrodes 208. Electrocrushing drill bit 114 may include solid insulator 210 surrounding electrode 208 and one or more orifices (not expressly shown in FIG. 1 or 2) on the face of electrocrushing drill bit 114 through which electrocrushing drilling fluid 122 exits drill string 108. Such orifices may be simple holes, or they may be nozzles or other shaped features. Because fines are not typically generated during electrocrushing drilling, as opposed to mechanical drilling, electrocrushing drilling fluid 122 may not need to exit the drill bit at as high a pressure as the drilling fluid in mechanical drilling. As a result, nozzles and other features used to increase drilling fluid pressure may not be needed. However, nozzles or other features to increase electrocrushing drilling fluid 122 pressure or to direct electrocrushing drilling fluid may be included for some uses. Additionally, the shape of solid insulator 210 may be selected to enhance the flow of electrocrushing drilling fluid 122 around the components of electrocrushing drill bit 114.

Electrocrushing drilling fluid 122 is typically circulated through drilling system 100 at a flow rate sufficient to remove fractured rock from the vicinity of electrocrushing drill bit 114. In addition, electrocrushing drilling fluid 122 may be under sufficient pressure at a location in wellbore 116, particularly a location near a hydrocarbon, gas, water, or other deposit, to prevent a blowout.

Electrocrushing drill bit 114 may include bit body 255, electrode 208, ground ring 250, and solid insulator 210. Electrode 208 may be placed approximately in the center of electrocrushing drill bit 114. The distance between electrode 208 and ground ring 250 may be a minimum of approximately 0.4 inches and a maximum of approximately 4 inches. The distance between electrode 208 and ground ring 250 may be based on the parameters of the electrocrushing drilling operation. For example, if the distance between electrode 208 and ground ring 250 is too small, electrocrushing drilling fluid 122 may break down and the arc between electrode 208 and ground ring 250 may not pass through the rock. However, if the distance between electrode 208 and ground ring 250 is too large, electrocrushing drilling bit 114 may not have adequate voltage to form an arc through the rock. For example, the distance between electrode 208 and ground ring 250 may be at least 0.4 inches, at least 1 inch, at least 1.5 inches, or at least 2 inches. The distance between electrode 208 and ground ring 250 may be based on the diameter of electrocrushing drill bit 114. The distance between electrode 208 and ground ring 250 may be generally symmetrical or may be asymmetrical such that the electric field surrounding the electrocrushing drill bit has a symmetrical or asymmetrical shape. The distance between electrode 208 and ground ring 250 allows electrocrushing drilling fluid 122 to flow between electrode 208 and ground ring 250 to remove vaporization bubbles from the drilling area. If drilling system 100 experiences vaporization bubbles in electrocrushing drilling fluid 122 near electrocrushing drill bit 114, the vaporization bubbles may have deleterious effects. For instance, vaporization bubbles near electrode 208 may impede formation of the arc in the rock. Electrocrushing drilling fluid 122 may be circulated at a flow rate also sufficient to remove vaporization bubbles from the vicinity of electrocrushing drill bit 114.

Electrode 208 has three sections: face 216, body 217, and stem 218. Face 216 is a distal portion of electrode 208 in contact with the rock during an electrocrushing drilling operation. For example, face 216 may engage with a portion of the wellbore, such as wellbore 116 shown in FIG. 1. Body 217 couples face 216 to stem 218. Stem 218 couples electrode 208 to electrocrushing drill bit 114. Electrode 208 may have any suitable diameter based on the drilling operation. For example, electrode 208 may have a diameter between approximately two and approximately ten inches. In some embodiments electrode 208 may be smaller than two inches in diameter. The diameter of the electrode may be based on the diameter of electrocrushing drill bit 114 and the distance between electrode 208 and ground ring 250, as described above.

The geometry of electrode 208 affects the electric field surrounding electrocrushing drill bit 114 during electrocrushing drilling. For example, the geometry of electrode 208 may be designed to result in an enhanced electric field surrounding electrode 208 so that the arcs initiate at electrode 208 and terminate on ground ring 250, or vice versa such that the arc initiates from ground ring 250 and terminate on electrode 208. The electric field surrounding electrode 208 may be designed so that most of the arcs initiating between electrode 208 and ground ring 250 do so through a path or multitude of paths that results in more efficient rock removal, for example a path or paths through the rock. Similarly, the electric field surrounding electrode 208 may be designed so as to minimize the arcs initiating between electrode 208 and ground ring 250 that do so through a path or multitude of paths that results in less efficient rock removal, for example path or paths short-cutting through the drilling fluid without penetrating the rock. For example, face 216 of electrode 208 may be engaged with a surface of the wellbore and a distal portion of ground ring 250 may also be engaged with the surface of the wellbore. The electric field may be designed such that the electric field is enhanced at a portion of electrode 208 proximate to face 216 and on a portion of ground ring 250 proximate to the distal portion of ground ring 250. An enhanced electric field in a region surrounding electrocrushing drill bit 114 may result in an increased electric flux in that region. For example, the electric field $E_s$ in the vicinity of a specifically shaped conducting structure will be larger than the average macroscopic electrical field created by the applied voltage over the average spacing $E_{applied}$ by the field enhancement factor, y, defined by the equation below:

$$Y=E_S/E_{applied}$$

The geometry of electrode 208 includes the profile of face 216, the shape of body 217, and contours of transitions between face 216, body 217, and stem 218. For example, face 216 may have a flat profile, a concave profile, or a convex profile. The profile may be based on the design of the electric field surrounding the electrocrushing drill bit. Body 217 may be generally conical shaped, cylindrical shaped, rectangular shaped, polyhedral shaped, tear drop shaped, rod shaped, or any other suitable shape. The transitions between face 216 and body 217 may be contoured to result in electric field conditions that are either favorable or unfavorable for arc initiation or termination. For example, the transition between face 216 and body 217 may have a sharp radius of curvature such that the electric field conditions are favorable for an arc to initiate and/or terminate at the transition between face 216 and body 217. In contrast, the transition between body 217 and stem 218 may have a gentle radius of curvature such that the conditions are not favorable for arc initiation and/or termination at the transition between body 217 and stem 218. A radius of curvature of a transition is the radius of a circle of which the arc of the transition is a part. By way of example, a sharp radius of curvature may be a radius greater than 0.01 inches, and sometimes in the range of approximately 0.05 to approximately 0.15 inches, such as approximately 0.094 inches, and a gentle radius of curvature may be a radius in the range of approximately 0.15 to approximately 1.0 inches, such as approximately 0.25 inches, approximately 0.5 inches, approximately 0.75 inches, or approximately 1.0 inches. The ratio of the gentle radius of curvature to the sharp radius of curvature may be by approximately 2:1 or more, and may be up to 5:1, 10:1, or substantially greater than 10:1. The gentle radius may be determined based on the geometry of the surrounding structures on electrocrushing drill bit 114 and the shape of the electric field for a given electrocrushing drilling operation. For example, the electric fields on electrode 208 may be a function of the geometry of ground ring 250 and the geometry and material of insulator 210. For example, the radius of the edge of electrode 208 and the shape of electrode 208 may affect the interaction of electrocrushing drill bit 114 with the rock. Additionally, the structure of ground ring 250 may be adjusted to change the electric field distribution on electrode 208. Further, the material used to form insulator 210 and the configuration of insulator 210 may be adjusted to change the electric field on electrode 208. In some examples, the dielectric constant of the electrocrushing drilling fluid and the geometry of the rock fragments and the wellbore during the drilling process may affect the instantaneous electric field distribution on electrode 208. The transitions are shown in more detail in FIGS. 3A-5B. Electrode 208 may be any of the electrodes shown in FIGS. 3A-5B.

The geometry of electrocrushing drill bit 114, and specifically certain dimensions between electrode 208 and ground ring 250, may be designed to maximize the occurrence of arc paths between the electrode and ground ring which travel through the rock, and/or to minimize short-cut paths for arcs to travel between the electrode and ground ring. Body 217, or body 217 in combination with stem 218, may be shaped to result in a first minimum distance between electrode 208 and ground ring 250, with a substantial portion of the electrode's conductive surface in the axial direction, perpendicular to face 216, being at a greater distance from ground ring 250. The first minimum distance may be a distance less than the average distance between electrode 208 and ground ring 250. The first minimum distance may result in a relative enhancement or concentration of the electric field at the perimeter of face 216 versus the balance of the axial extent of electrode 208, for example such that first minimum distance is at least approximately 15% less than the average distance between electrode 208 and ground ring 250, at least approximately 25% less than the average distance between electrode 208 and ground ring 250, or at least approximately 50% less than the average distance between electrode 208 and ground ring 250. A conical shaped ground ring as shown in FIG. 2 may achieve this criterion, as may a semi-sphere or certain other geometries. For example, in FIG. 2, the first minimum distance may be the distance between the perimeter of face 216 and ground ring 250 while the average distance between electrode 308 and ground ring 250 is calculated including the distance between body 217 and ground ring 250 and stem 218 and ground ring 250. The first minimum distance may be such that the electric field is enhanced or concentrated on a portion of electrode 208 proximate to face 216 and on a portion of ground ring 250 proximate to the distal portion of ground ring 250.

Ground ring 250 may function as an electrode and provide a location on the electrocrushing drill bit where an arc may initiate and/or terminate. Ground ring 250 also provides one or more fluid flow ports 260 such that electrocrushing drilling fluids flow through fluid flow ports 260 carry fractured rock and vaporization bubbles away from the drilling area. Further, ground ring 250 provides structural support for electrocrushing drill bit 114 to support the downforce caused by the weight of the electrocrushing drilling components uphole from electrocrushing drill bit 114, such as drill string 108 shown in FIG. 1. Electrocrushing drill bit 114 may additionally include an additional structural component (not expressly shown) that supports the downforce created by the weight of the electrocrushing drilling components uphole from electrocrushing drill bit 114. For example, an insulative ring or studs may be located on electrocrushing drill bit 114 to bear some or all of the weight of the electrocrushing drilling components and the weight of some or all of the drill string. As another example, a structural support structure, physically separated from but coupled to the ground ring electrode, may be used to support the weight of electrocrushing drilling components and drill string.

Figure 3A:
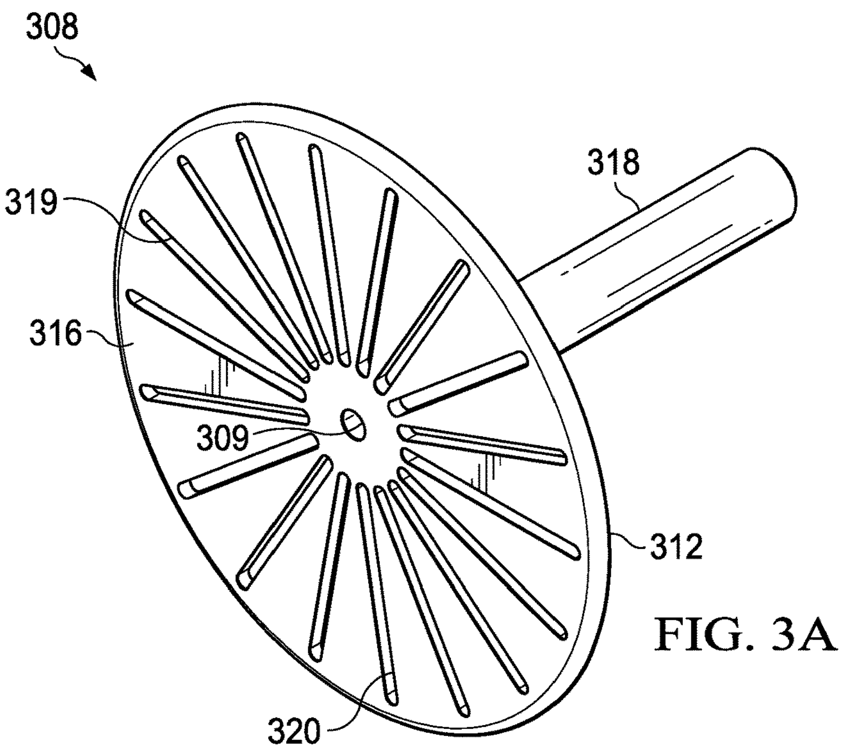
FIG. 3A is a perspective view of an exemplary electrode for a downhole electrocrushing drill bit.
Figure 3B:
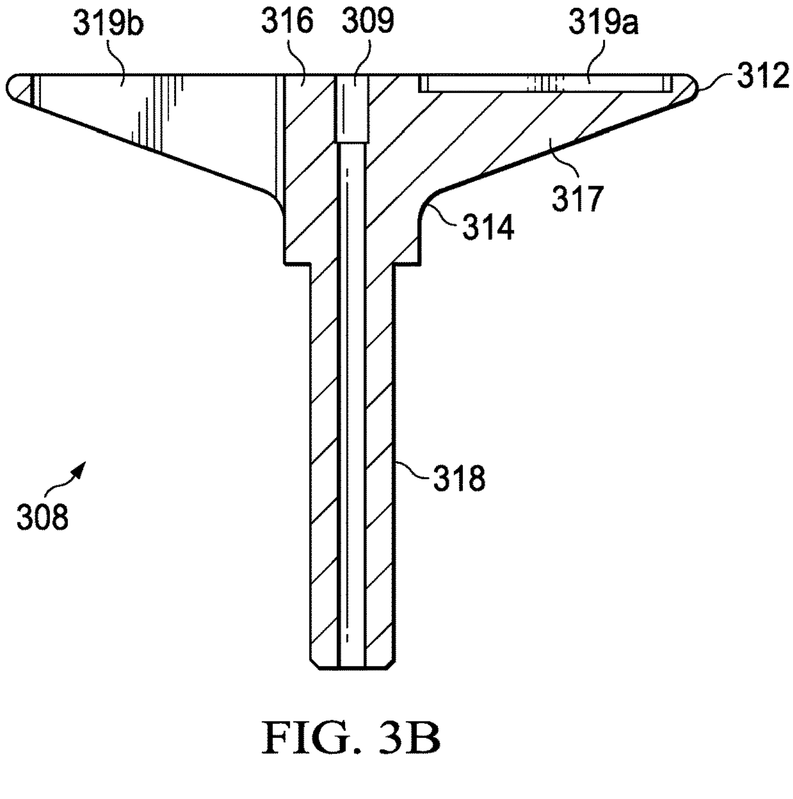
FIG. 3B is a cross-sectional view of the electrode shown in FIG. 3A.

FIG. 3A is a perspective view of an exemplary electrode for a downhole electrocrushing drill bit. FIG. 3B is a cross-sectional view of the electrode shown in FIG. 3A. Electrode 308 provides a similar function and has similar features as electrode 208 shown in FIG. 2.

High electrical energy pulses from a power source may be applied to electrode 308 to generate an arc as described in more detail in FIGS. 1 and 2. As described with reference to FIG. 2, the contours of the transitions between parts of electrode 308 affect the electric field surrounding the electrocrushing drill bit. For example, the transition between face 316 and body 317, edge 312, may have a sharp radius of curvature, as described above with reference to FIG. 2, such that the electric field conditions are favorable for an arc to initiate and/or terminate at edge 312. In contrast, transition 314, between body 317 and stem 318, may have a gentle radius of curvature such that the electric field conditions are not favorable for arc initiation and/or termination.

Electrode 308 may further include fluid flow opening 309 extending through stem 318 and body 317 to face 316 to direct electrocrushing drilling fluids from a drill string, such as drill string 108 shown in FIG. 1, downhole to the electrocrushing drilling bit. For example, the electrocrushing drill bit may be coupled to the drill string and electrocrushing drilling fluid may flow downhole through the drill sting, to electrocrushing drill bit and exit through fluid flow opening 309. A portion or all of the fluid flowing through the drill string may exit through fluid flow opening 309. Fluid flow opening 309 may be centered on face 316, as shown in FIGS. 3A and 3B, or may be offset radially. The flow path may be coaxial with electrode 308 or may be at an angle offset from the centerline of electrode 308. Fluid flow opening 309 may have a cross sectional area designed to result in higher fluid velocity than the flow through the drill string, and may include an orifice or jet.

Alternatively, fluid flow opening 309 may be used to accept a bolt to attach electrode 308 to the internal structure of the BHA (not expressly shown) to which electrode 308 is attached. Electrode 308 may further include slots 319 that facilitate the flow of electrocrushing drilling fluids around electrode 308. The presence of slots 319 may modify the direction and/or velocity of the flow of electrocrushing drilling fluid through the drilling area. Some slots 319 may be channels on face 316 of electrode 308, as shown by slot 319*a* in FIG. 3B, that extends partially through body 317. Other slots 319 may extend through body 317, as shown by slot 319*b* in FIG. 3B. Some or all slots 319 may terminate short of intersecting with fluid flow opening 309, as shown in FIGS. 3A and 3B and some or all slots 319 may intersect with fluid flow opening 309. Electrode 308 may have any combination of slots 319. As shown in FIG. 3A, edge 320 of each slot 319 may have a sharp radius of curvature, as described above with reference to FIG. 2, to create favorable conditions in the electric field for arc initiation and/or termination. Edge 320 of each slot 319 may also have a sharp radius or any other radius of curvature suitable for the drilling and/or fabrication process.

Electrode 308 may be manufactured from any material that can withstand the conditions in a wellbore and has sufficient conductivity to conduct thousands of amps per pulse without structurally damaging the electrode, such as steel in the 41 family (often designated as the 41xx family, for example 4140 steel), carbon alloyed steel, stainless steel, nickel and nickel alloys, copper and copper alloys, titanium and titanium alloys, chromium and chromium alloys, molybdenum and molybdenum alloys, doped ceramics, composite materials using a matrix material having a high melting point, such as tungsten and a reinforcement material having a high conductivity and low melting point, such as copper, brass, silver, or gold, and combinations thereof. The conductivity of electrode 308 may be a function of the geometry of electrode 308 and the shape of the arc that forms between electrode 308 and the ground ring or other electrodes on the electrocrushing drilling bit. For example, the minimum conductivity of electrode 308 may be based on the voltage requirements of the electrocrushing drilling operation and such conductivities (measured at 20° C.) may be at least approximately 0.5×10/\6 1/ohm-meter, at least approximately 1.0×10/\7 1/ohm-meter, or higher. When an arc initiates or terminates at electrode 308, the temperature at the initiation or termination point increases such that the temperature melts the surface of electrode 308. Arc creation is often accompanied by a shock wave. When the shock wave impacts the melted surface of electrode 308, a portion of the melted surface may separate from the remainder of electrode 308 and be carried uphole with the electrocrushing drilling fluid. Therefore, to prevent material loss, the areas of electrode 308, for example edges 312 and/or 320, having electric field conditions favorable to arc initiation and/or termination may be coated with or made of a metal matrix composite. The metal matrix composite may be formed of a matrix material having a high melting point, and/or high resistance to electrical erosion, such as tungsten, carbide, ceramic, polycrystalline diamond compact, carbon fiber, graphene, graphite, olivene ($FEPO_4$), carbon tubes or combinations thereof, infused with a metal having a low melting point, such as copper, gold, silver, indium, or combinations thereof. For example, the metal matrix composite may be a tungsten and copper composite such as ELKONITE®, manufactured and sold by CMW Inc. of Indianapolis, Indiana. The melting point of the matrix material may be higher than the melting point of the infused metal. During arc initiation and/or termination, the infused metal may melt while the matrix material remains solid to hold the melted infused metal in place during the shock wave motion. After the temperature decreases, the infused metal solidifies without any material loss.

Although FIGS. 3A-3B illustrate a particular electrode design having a certain combination of features, electrode 308 may use any suitable combination of features to generate an arc. Such features may include any one or more of the features of electrode 408 shown in FIGS. 4A-4B and/or electrode 508 shown in FIGS. 5A-5B, such as one or more notches and/or a spring.

Figure 4A:
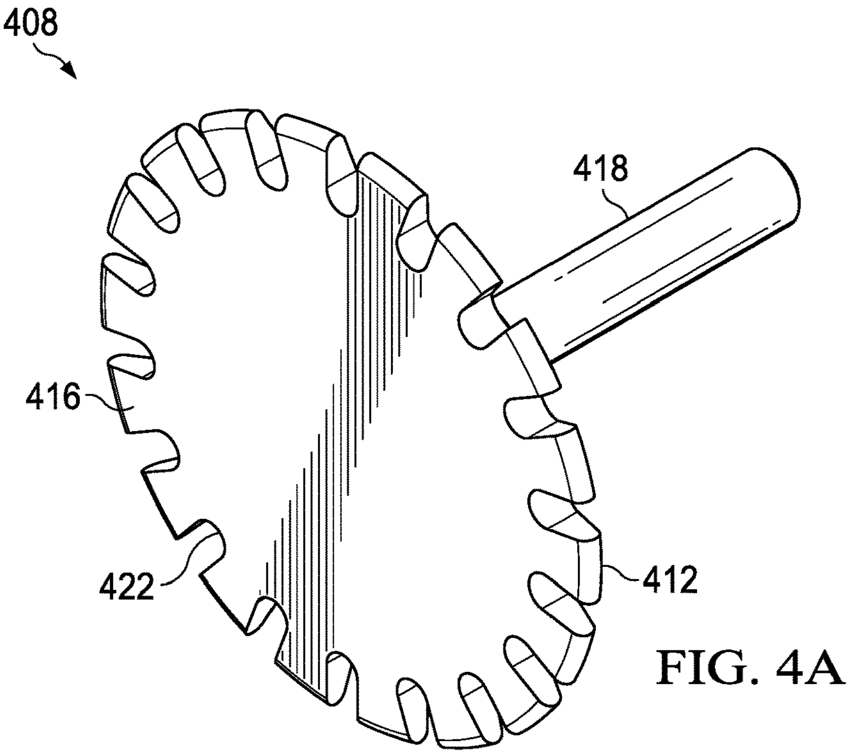
FIG. 4A is a perspective view of an exemplary electrode for a downhole electrocrushing drill bit.
Figure 4B:
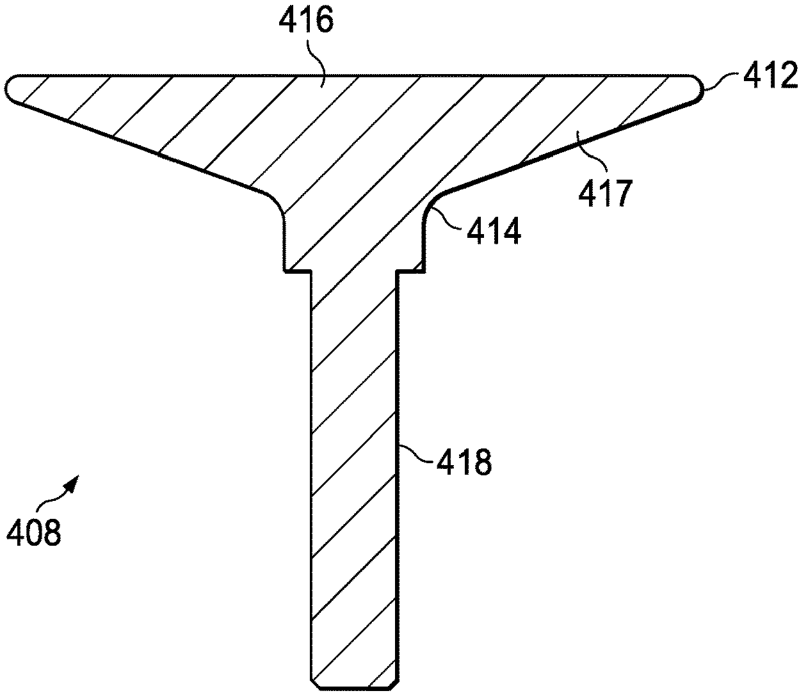
FIG. 4B is a cross-sectional view of the electrode shown in FIG. 4A.

FIG. 4A is a perspective view of an exemplary electrode for a downhole electrocrushing drill bit. FIG. 4B is a cross-sectional view of the electrode shown in FIG. 4A. Electrode 408 provides a similar function and has similar features as electrode 208 shown in FIG. 2.

As described with respect to FIG. 2, the contours of the transitions between parts of electrode 308 affect the electric field surrounding the electrocrushing drill bit. For example, edge 412 may have a sharp radius of curvature such that the electric field conditions are favorable for arc initiation and/or termination at edge 412. In contrast, transition 414 may have a gentle radius of curvature such that the electric field conditions are not favorable for arc initiation and/or termination.

Electrode 408 may further include one or more notches 422 along edge 412. The presence of notches 422 may change the electric field surrounding electrode 408 by increasing the electric field near electrode 408. Edge 412 of notches 422 may have a sharp radius of curvature to create conditions favorable for arc initiation and/or termination by providing a larger perimeter of electrode 408 having a sharp radius of curvature than the perimeter of a smooth edge (as shown in FIG. 3A). While notches 422 are shown as U-shaped in FIG. 4A, notches 422 may have any suitable shape including triangular, rectangular, polygonal, circular, or any combination thereof. While notches 422 are shown as indentations in edge 412, in some examples edge 412 may have discontinuities that protrude out from edge 412. Additionally, while electrode 408 is shown as including notches 422, any discontinuity along edge 412 may achieve a similar effect as notches 422. For example, edge 412 may be serrated or dimpled. Additionally, discontinuities on face 416 may also achieve a similar effect as discontinuities along edge 412. For example, face 416 may include buttons, dimples, or protrusions. The size of the discontinuities along edge 412 may be a function of the spacing between electrode 408 and a ground ring, the radius of electrode 408, the type of rock being drilled, the fluid flow path of the electrocrushing drilling fluid, or any combination thereof. The discontinuities may protrude outward, or indent inward, from edge 412 or face 416, a distance (measured perpendicular to edge 412 or face 416) from approximately 0.03 inch to approximately 0.12 inch, or up to approximately 0.25 inch or more. The aggregate perimeter length of discontinuities along edge 412 (i.e., the portion of the perimeter interrupted by such discontinuities) may total approximately 5% to approximately 30% of the perimeter length, approximately 25% to approximately 75% of the perimeter length, or more. The aggregate area of discontinuities on face 416 (i.e., the portion of the face surface area interrupted by such discontinuities) may total approximately 5% to approximately 30% of the surface area of face 416, approximately 25% to approximately 75% of the surface area, or more. The discontinuities may be distributed uniformly about the perimeter of edge 412 or uniformly upon face 416, or may be enhanced or concentrated in portions of the perimeter of edge 412 (e.g., enhanced or concentrated in center of each of 4 quadrants) or portions of the area of face 416 (e.g., enhanced or concentrated in a band on face 416 near edge 412, or in multiple concentric bands, or enhanced or concentrated in other zones within face 416).

Electrode 408 may be manufactured from materials similar to the materials described with respect to electrode 308 in FIGS. 3A-3B, such as steel in the 41 family (often designated as the 41xx family, for example 4140 steel), carbon alloyed steel, stainless steel, nickel and nickel alloys, copper and copper alloys, titanium and titanium alloys, chromium and chromium alloys, molybdenum and molybdenum alloys, doped ceramics, and combinations thereof. Additionally, the areas of electrode 408 having electric field conditions favorable to arc initiation and/or formation may be coated with or made of a metal matrix composite as described in FIGS. 3A-3B.

Although FIGS. 4A-4B illustrate a particular electrode design having a certain combination of features, electrode 408 may use any suitable combination of features to generate an arc. Such features may include any one or more of the features of electrode 308 shown in FIGS. 3A-3B and/or electrode 508 shown in FIGS. 5A-5B, such as a fluid flow port, one or more slots, and/or a spring.

Figure 5A:
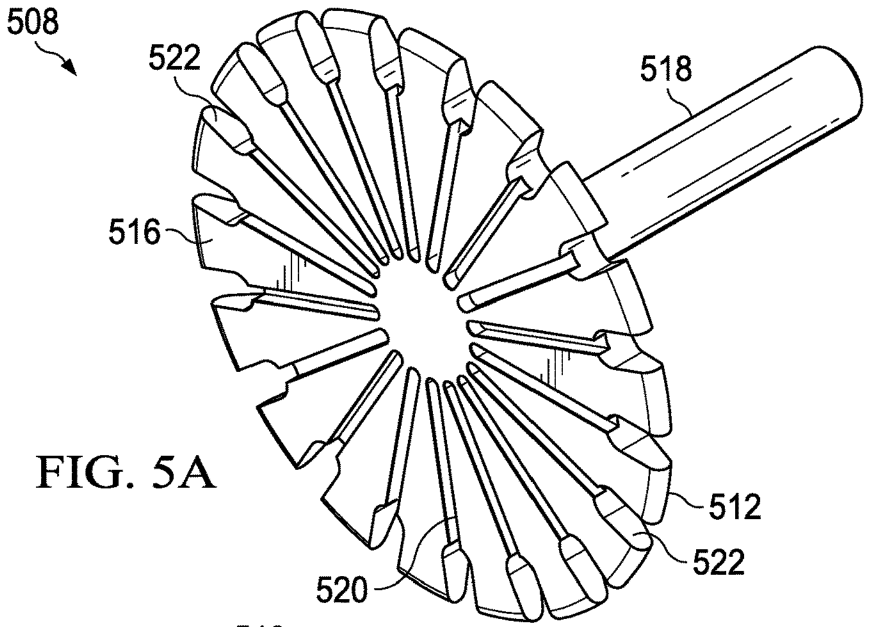
FIG. 5A is a perspective view of an exemplary electrode for a downhole electrocrushing drill bit.
Figure 5B:
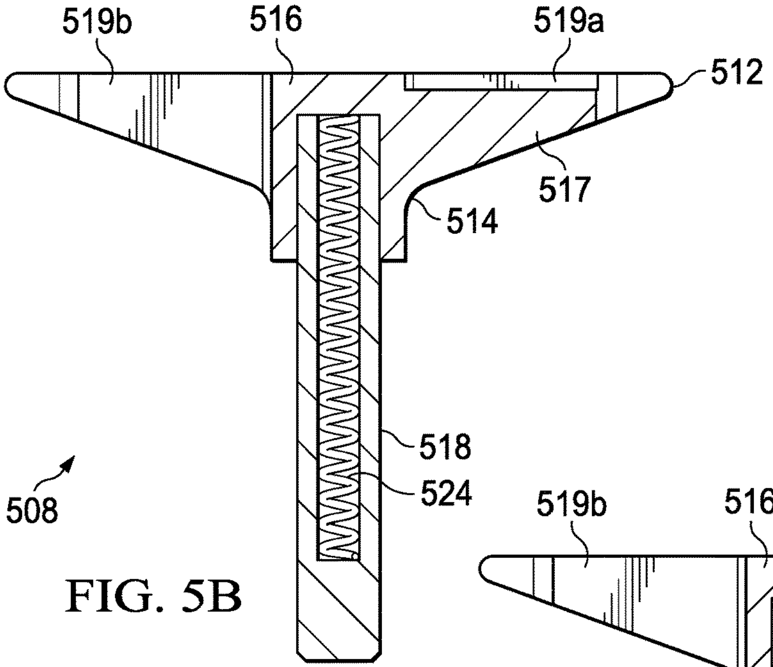
FIG. 5B is a cross-sectional view of the electrode shown in FIG. 5A.

FIG. 5A is a perspective view of an exemplary electrode for a downhole electrocrushing drill bit. FIG. 5B is a cross-sectional view of the electrode shown in FIG. 5A. Electrode 508 provides a similar function and has similar features as electrode 208 shown in FIG. 2.

As described with respect to FIG. 2, the contours of the transitions between parts of electrode 208 affect the electric field surrounding the electrocrushing drill bit. For example, edge 512 may have a sharp radius of curvature such that the electric field conditions at edge 512 are favorable for arc initiation and/or termination. In contrast, transition 514, where body 517 joins stem 518 of electrode 508, may have a gentle radius of curvature such that the electric field conditions are not favorable for arc initiation and/or termination.

Similar to electrode 408 shown in FIGS. 4A-4B, electrode 508 may further include one or more notches 522 along edge 512. The presence of notches 522 may change the electric field surrounding electrode 508 by increasing the electric field near electrode 508. Edge 512 of notches 522 may have a sharp radius of curvature to create conditions favorable for arc initiation and/or termination by providing a larger perimeter of electrode 508 having a sharp radius of curvature than the perimeter of a smooth edge (as shown on electrode 308 in FIG. 3A). While notches 522 are shown as U-shaped in FIG. 5A, notches 522 may have any suitable shape including triangular, rectangular, polygonal, circular, or any combination thereof.

Electrode 508 may be manufactured from materials similar to the materials described with respect to electrode 308 in FIGS. 3A-3B, such as steel in the 41 family (often designated as the 41xx family, for example 4140 steel), carbon alloyed steel, stainless steel, nickel and nickel alloys, copper and copper alloys, titanium and titanium alloys, chromium and chromium alloys, molybdenum and molybdenum alloys, doped ceramics, and combinations thereof. Additionally, the areas of electrode 508 having electric field conditions favorable to arc initiation and/or formation may be coated with or made of a metal matrix composite as explained in FIGS. 3A-3B.

Electrode 508 may additionally include one or more slots 519 that facilitate the flow of electrocrushing drilling fluid around electrode 508. Some slots 519 may be channels on face 516 of electrode 508, as shown by slot 519*a* in FIG. 5B, that extend partially through body 517. Other slots 519 may extend through body 517, as shown by slot 519*b* in FIG. 5B. Electrode 508 may have any combination of slots 519. Edge 520 of each slot 519 may have a sharp radius of curvature to create favorable conditions in the electric field for arc initiation and/or termination.

Figure 5C:
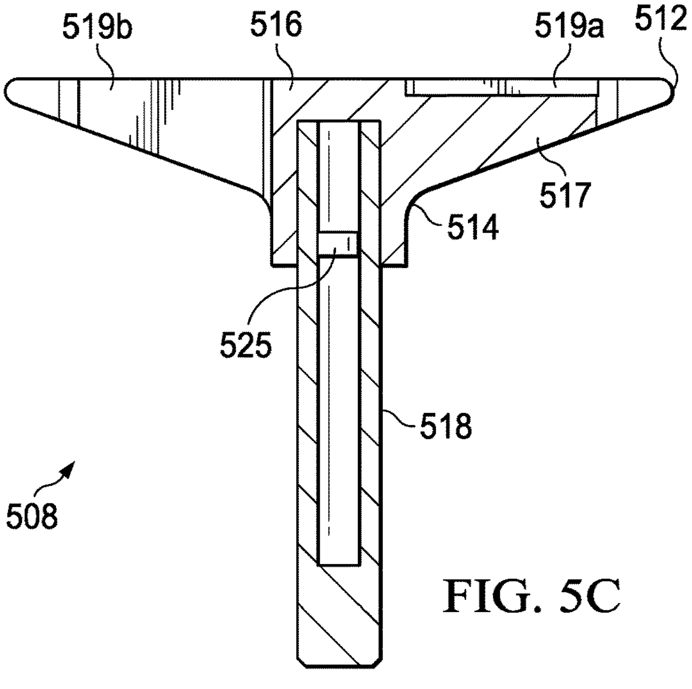
FIG. 5C is a cross-sectional view of an alternative design of the electrode shown in FIG. 5A.

Electrode 508 may further include a biasing device that urges electrode 508 away from the drill string and into contact with the rock through which the electrocrushing drill bit is drilling. For example, as shown in FIG. 5, electrode 508 includes internal spring 524. Spring 524 may be located in a fluid flow port, such as fluid flow port 309 shown in FIG. 3B, or a bolt attachment socket as described with reference to FIGS. 3A-3B. The action of spring 524 may then move electrode 508 in a direction away from the drill string and toward the rock such that face 516 maintains contact with the rock during the electrocrushing drilling operation. In some electrocrushing drill bits, spring 524 may be replaced with piston 525 (as shown in FIG. 5C) and/or a magnetic device that cause face 516 to maintain contact with the rock. Piston 525 may be activated by the pressure of the electrocrushing drilling fluid in the drill string. The magnetic device may be activated using the current pulses sent to electrode 508.

Although FIGS. 5A-5C illustrate a particular electrode design having a certain combination of features, electrode 508 may use any suitable combination of features to generate an arc. Such features may include any one or more of the features of electrode 308 or electrode 408 shown in FIGS. 3A-4B, such as a fluid flow port.

Figure 6A:
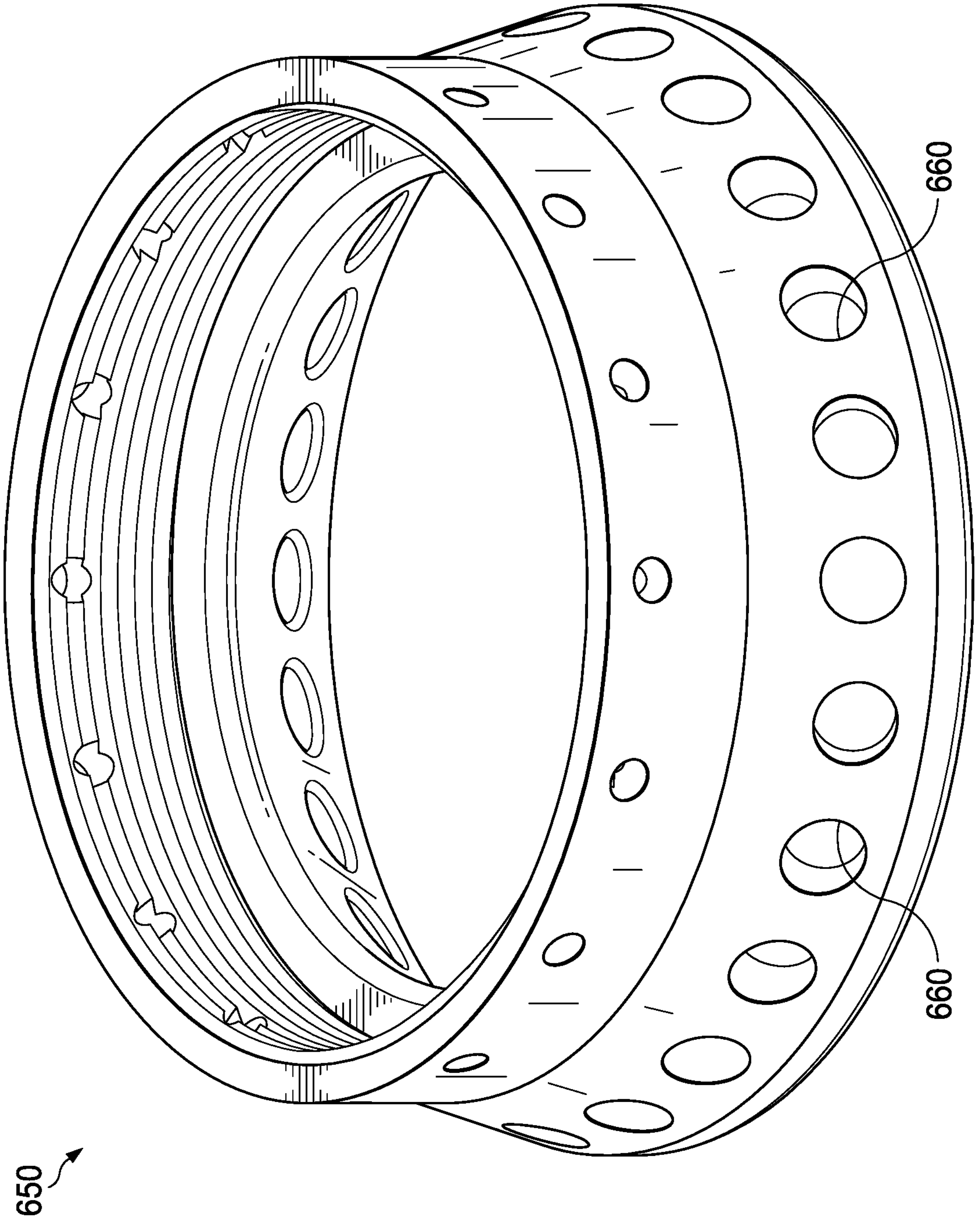
FIG. 6A is a perspective view of an exemplary ground ring for a downhole electrocrushing drill bit.
Figure 6B:
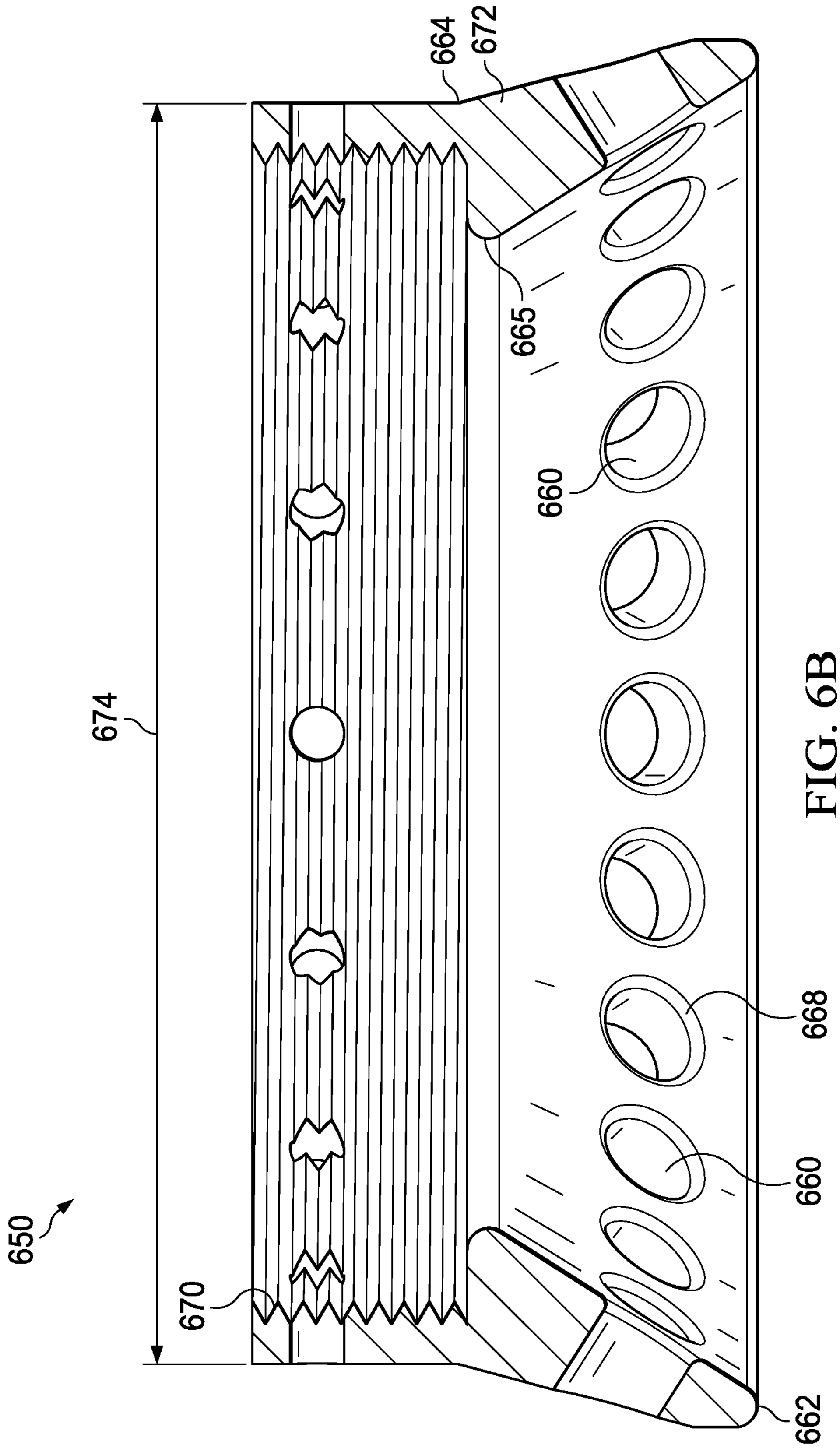
FIG. 6B is a cross-sectional view of the ground ring shown in FIG. 6A.

FIG. 6A is a perspective view of an exemplary ground ring for a downhole electrocrushing drill bit. FIG. 6B is a cross-sectional view of the ground ring shown in FIG. 6A. Ground ring 650 provides a similar function and has similar features as ground ring 250 shown in FIG. 2.

The shape of ground ring 650 may be selected to change the shape of the electric field surrounding the electrocrushing drill bit during electrocrushing drilling. For example, the electric field surrounding the electrocrushing drill bit may be designed so that the arc initiates at an electrode and terminates on ground ring 650 or vice versa such that the arc initiates from ground ring 650 and terminates on the electrode. The electric field changes based on the shape of the contours of the edges of ground ring 650. For example, downhole edge 662 may have a sharp radius of curvature such that the electric field conditions at downhole edge 662 are favorable for arc initiation and/or termination. Additionally, downhole edge 662 may be a distal portion of ground ring 650 that engages with a portion of the wellbore, such as wellbore 116 shown in FIG. 1. Curve 665 on the inner perimeter of ground ring 650 may have a gentle radius of curvature to such that the electric field conditions at curve 665 are not favorable for arc initiation and/or termination. A radius of curvature of a transition is the radius of a circle of which the arc of the transition is a part. By way of example, a sharp radius of curvature may be a radius in the range of approximately 0.05 to approximately 0.15 inches, such as approximately 0.094 inches, and a gentle radius of curvature may be a radius in the range of approximately 0.20 to approximately 1.0 inches or more, such as approximately 1.0 inches or more, such as approximately 0.25 inches, approximately 0.5 inches, approximately 0.75 inches, or approximately 1.0 inches. The gentle radius may be determined based on the geometry of the surrounding structures on electrocrushing drill bit 114 and the shape electric field for a given electrocrushing drilling operation. For example, the electric fields on electrode 208 may be a function of the geometry of ground ring 250 and the geometry and material of insulator 210. For example, the radius of the edge of electrode 208 and the shape of electrode 208 may affect the interaction of electrocrushing drill bit 114 with the rock. Additionally, the structure of ground ring 250 may be adjusted to change the electric field distribution on electrode 208. Further, the material used to form insulator 210 and the configuration of insulator 210 may be adjusted to change the electric field on electrode 208. In some examples, the dielectric constant of the electrocrushing drilling fluid and the geometry of the rock fragments and the wellbore during the drilling process may affect the instantaneous electric field distribution on electrode 208. The features on ground ring 650 having a sharp radius of curvature may have the same or different sharp radius as features on the electrode having a sharp radius of curvature.

Ground ring 650 may include one or more fluid flow ports 660 on the outer perimeter of ground ring 650 to direct electrocrushing drilling fluid from around an electrode, out of the drilling field, and uphole to clear debris from the electrocrushing drilling field. The number and placement of fluid flow ports 660 may be determined based on the flow requirements of the electrocrushing drilling operation. For example, the number and/or size of fluid flow ports 660 may be increased to provide a faster fluid flow rate and/or larger fluid flow volume. Edge 668 of each fluid flow port 660 may have a gentle radius of curvature such that the electric field conditions at edge 668 of each fluid flow port 660 are not favorable for arc initiation and/or termination.

Ground ring 650 may be manufactured from any material that can withstand the conditions in the wellbore and support the downforce from the uphole drilling components, such as steel in the 41 family (often designated as the 41xx family, for example 4140 steel), carbon alloyed steel, stainless steel, nickel and nickel alloys, copper and copper alloys, titanium and titanium alloys, chromium and chromium alloys, molybdenum and molybdenum alloys, doped ceramics, and combinations thereof. As described with respect to electrode 308, when an arc initiates or terminates at ground ring 650, the temperature at the initiation or termination point increases such that the temperature melts the surface of ground ring 650. When the shock wave hits the melted surface of ground ring 650, a portion of the melted surface may separate from the remainder of ground ring 650 and be carried uphole with the electrocrushing drilling fluid. Therefore, to prevent material loss, the areas of ground ring 650 having electric field conditions favorable to arc initiation and/or termination may be coated with or made from a metal matrix composite, as described in FIGS. 3A-3B.

Ground ring 650 may further include threads 670 along the inner diameter of ground ring 650. Threads 670 may engage with corresponding threads on a portion of an electrocrushing drill bit such that ground ring 650 is replaceable during the electrocrushing drilling operation. Ground ring 650 may be replaced if ground ring 650 is damaged by erosion or fatigue during an electrocrushing drilling operation.

The thickness of wall 672 of ground ring 650 may be based on the diameter of ground ring 650 and/or the weight of the uphole components of the electrocrushing drilling system that are exerting downforce on ground ring 650. For example, the thickness of wall 672 may range from approximately 0.25 inches to approximately 2 inches. The thickness of wall 672 may be based on the diameter of ground ring 650 such that the thickness of wall 672 increases as the diameter of ground ring 650 increases. Additionally, the thickness of wall 672 may taper such that the thickness is the smallest at downhole edge 662 and the largest between curve 664 and curve 665. For example, the thickness of wall 672 may be approximately 0.3 inches at downhole edge 662 and increase to approximately 0.8 inches between curve 664 and curve 665. The tapering of the thickness of wall 672 may provide annular clearance for the flow of electrocrushing drilling fluid to clear debris from between the bottom hole assembly to which the electrocrushing drill bit is attached and the inner wall of the wellbore.

Diameter 674 of ground ring 650 may be based on the diameter of the wellbore and the annular clearance between the wellbore and the bottom hole assembly to which the electrocrushing drill bit is attached. The diameter of the electrode contained within ground ring 650 on the electrocrushing drill bit may be selected for drilling a particular type of formation. For example, the diameter of the electrode may be selected to optimize the electric field surrounding the electrocrushing drill bit and provide flow space for electrocrushing drilling fluid. Ground ring 650 may have an outer diameter equal to the gauge of the wellbore to be drilled by the electrocrushing drill bit or may have an outer diameter slightly smaller than the gauge of the wellbore to be drilled. For example, the outer diameter of ground ring 650 may be at least 0.03 inches or at least 0.5 inches smaller than the gauge of the wellbore to be drilled. In some examples, ground ring 650 may have features on the inner diameter of ground ring 650, such as curve 665, may have a gentle radius while features on the outer diameter of ground ring 650, such as curve 664, may have a sharp radius such that the electrocrushing drill bit creates an overgauged wellbore during a drilling operation.

During the electrocrushing drilling operation, the electrode and ground ring 650 may have opposite polarities to create electric field conditions such that arcs initiate at the electrode and terminate on the ground ring or vice versa such that the arcs initiate at ground ring 650 and terminate on the electrode. For example, the electrode may have a positive polarity while ground ring 650 has a negative polarity.

Figure 7:
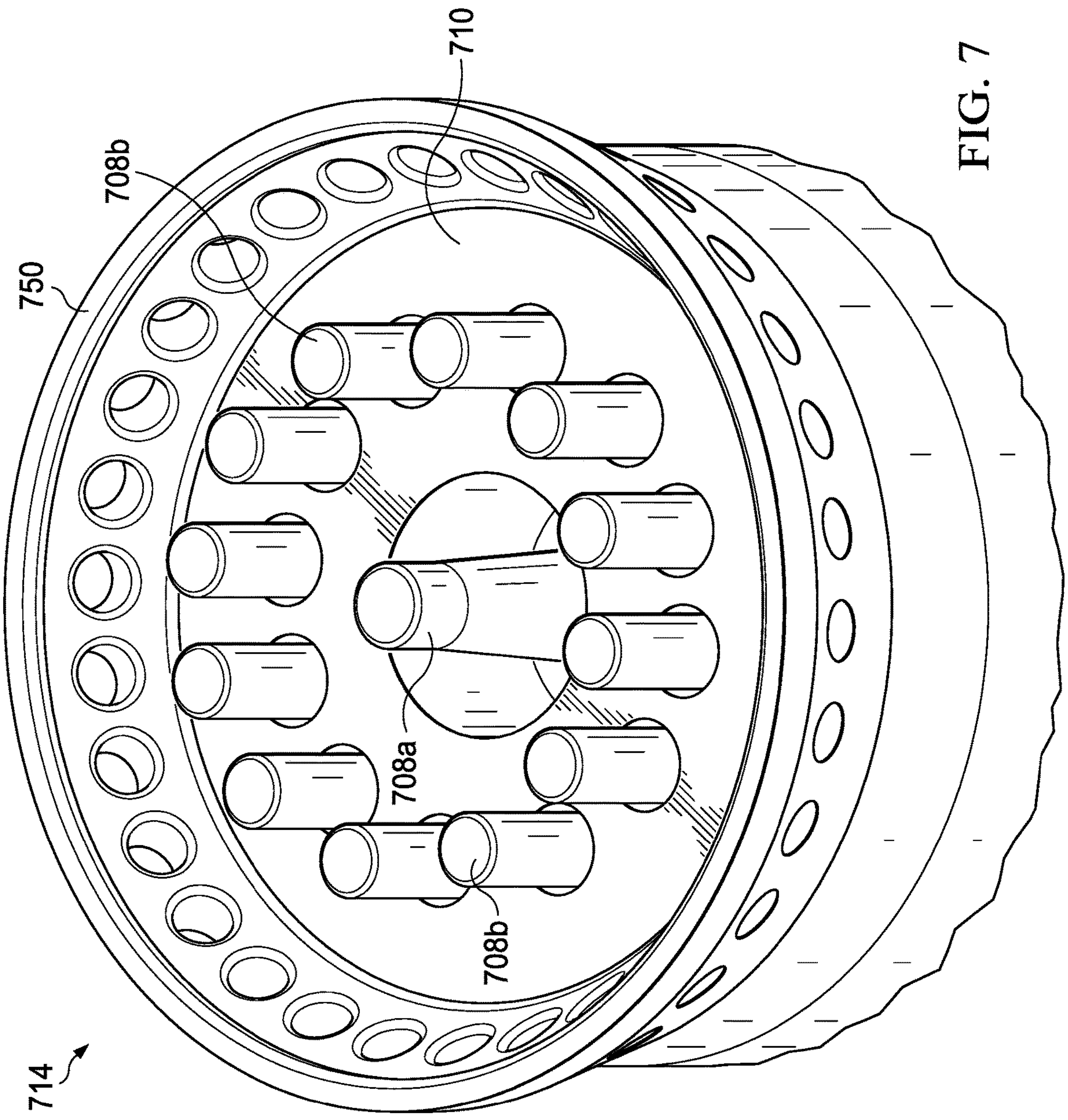
FIG. 7 is a perspective view of an electrocrushing drill bit including multiple electrodes and a ground ring.

FIG. 7 is a perspective view of an electrocrushing drill bit including multiple electrodes and a ground ring. Electrocrushing drill bit 714 may include multiple electrodes 708. Electrodes 708 may be similar to electrode 208, shown in FIG. 2 and may have any of the features of electrodes 308, 408, and/or 508, shown in FIGS. 3A-5B, such as notches, dimples, serration, or other discontinuities. For example, while electrodes 708 are shown as rod-shaped in FIG. 7, electrodes 708 may be conical shaped. Electrodes 708 may have different voltages applied to each electrode 708 when electrical energy is applied to electrodes 708. For example, ground ring 750 and electrode 708*a* may be at ground potential and electrodes 708*b* may have a peak voltage of 150 kV.

Electrocrushing drill bit 714 may additionally include solid insulator 710 and ground ring 750. Solid insulator 710 may be similar to solid insulator 210 shown in FIG. 2. Ground ring 750 may be similar to ground ring 250 shown in FIG. 2 and may have any of the features of ground ring 650 shown in FIGS. 6A-6B.

Figure 8:
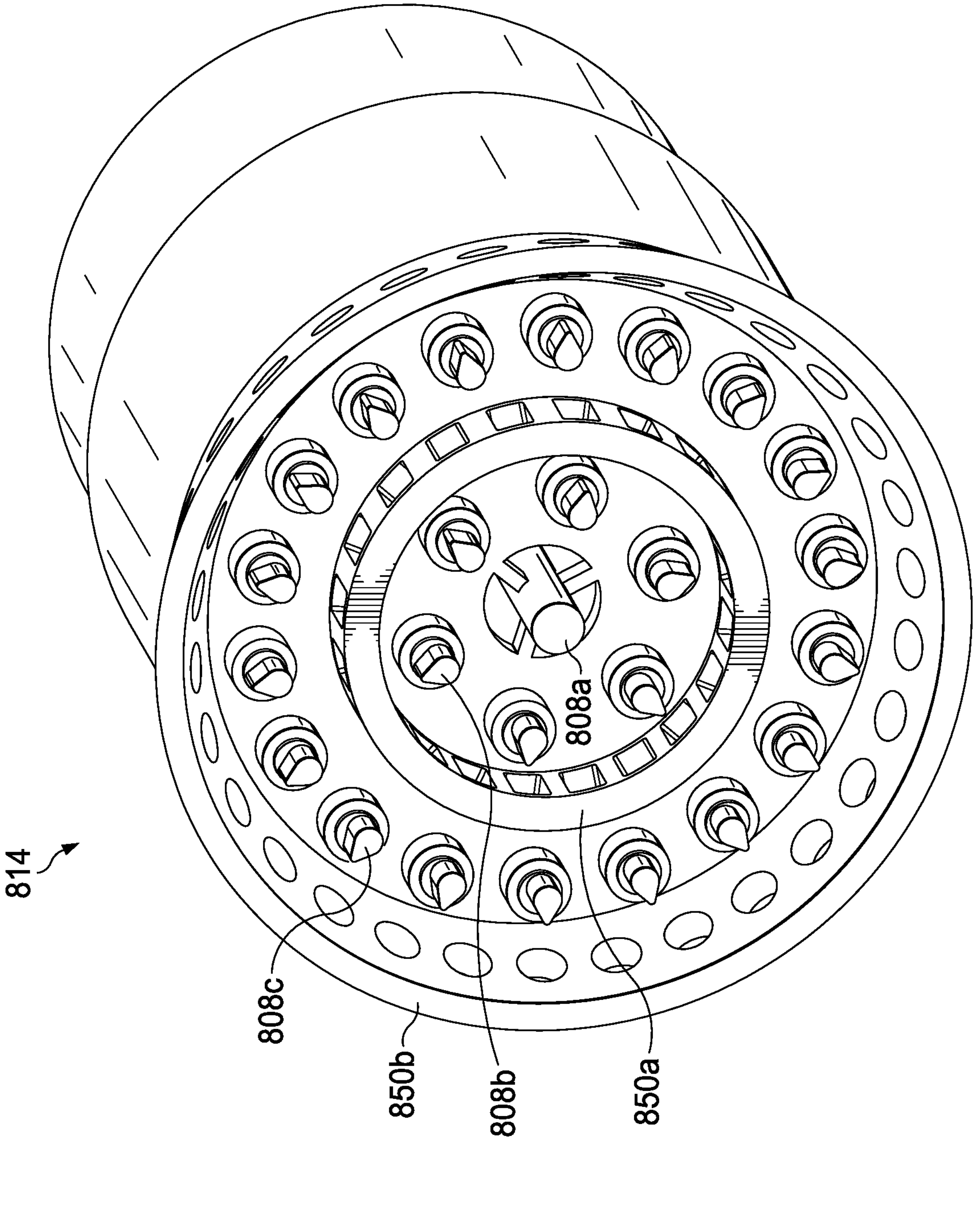
FIG. 8 is a perspective view of an electrocrushing drill bit including multiple electrodes arranged in multiple rows with an external ground ring and an intermediate ground ring.

The features of an electrocrushing drill bit described with respect to FIGS. 1-6B may be combined in any configuration. For example, FIG. 8 is a perspective view of an electrocrushing drill bit including multiple electrodes arranged in multiple rows with an external ground ring and an intermediate ground ring. Electrocrushing drill bit 814 may include multiple electrodes 808. Electrodes 808 may be similar to electrode 708, shown in FIG. 7 and may have any of the features of electrodes 308, 408, and/or 508, shown in FIGS. 3A-5B, such as notches, dimples, serration, or other discontinuities. For example, while electrodes 708 are shown as rod-shaped in FIG. 7, electrodes 808 may be conical shaped. Electrodes 808 may be shaped to facilitate fluid flow, including a tapered or airfoil shape. Electrodes 808*b* may be arranged in a pattern of one or more circular rows around center electrode 808*a* Electrodes 808 may have different voltages applied to different sets of electrodes when the electrical pulse is applied to electrodes 808. For example, outer ground ring 850*b*, intermediate ground ring 850*a*, and center electrode 808*a* may be at ground potential and electrodes 808*b* and 808*c* may have a peak voltage of approximately 150 kV.

Electrocrushing drill bit 814 may additionally include ground rings 850*a* and 850*b*. Ground ring 850*b* may be similar to ground ring 250 shown in FIG. 2 and may have any of the features of ground ring 650 shown in FIGS. 6A-6B. Ground ring 850*a* may have rectangular ports, circular ports, or ports of other geometric shapes.

Electrocrushing drill bit 814 may be capable of electrically controlled directional drilling. A portion, for example approximately one-third, of electrodes 808 in FIG. 8 may be electrically connected and may fire at a higher repetition rate than the other electrodes 808, for example approximately two-thirds of electrodes 808. Electrocrushing drill bit 814 may turn towards the slow repetition rate electrodes. In this manner, electrocrushing drill bit 814 may be used to electrically steer the drill during drilling operations by independently controlling the repetition rate of groups of electrodes 808.

Figure 9:
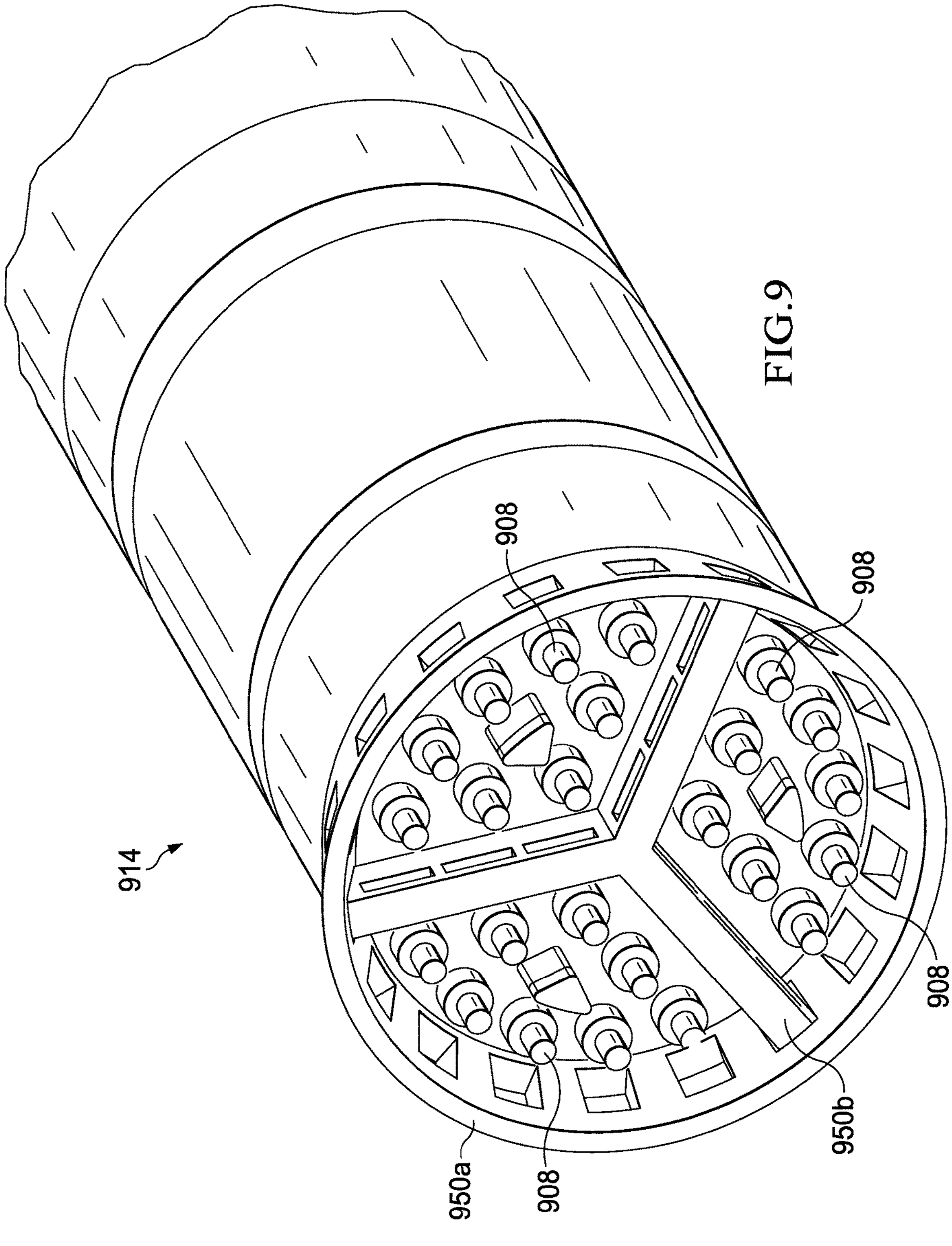
FIG. 9 is a perspective view of an electrocrushing drill bit including multiple electrodes, an outer ground ring, and an intermediate ground ring traversing the outer ground ring to divide the bit into three regions.

FIG. 9 is a perspective view of an electrocrushing drill bit including multiple electrodes, an outer ground ring, and an intermediate ground ring traversing the outer ground ring to divide the bit into three regions. Electrocrushing drill bit 914 may include multiple electrodes 908. Electrodes 908 are arranged in three groups within each of three segments formed by the transverse ground ring. Electrodes 908 may be similar to electrodes 808 or 708, shown in FIGS. 7 and 8 and may have any of the features of electrodes 308, 408, and/or 508, shown in FIGS. 3A-5B, such as notches, dimples, serration, or other discontinuities. For example, while electrodes 708 are shown as rod-shaped in FIG. 7, electrodes 908 may be conical shaped. Electrodes 908 may be shaped to facilitate fluid flow, including a tapered or airfoil shape. Electrodes 908 may have different voltages applied to different groups of electrodes when the electrical pulse is applied to electrodes 908. For example, outer ground ring 950*a* and transverse ground structure 950*b* may be at ground potential and electrodes 908 may have a peak voltage of approximately 150 kV. While electrodes 908 are shown in FIG. 9 as arranged in three segments, electrodes 908 may be arranged in more or fewer segments.

Electrocrushing drill bit 914 may additionally include outer ground ring 950*a* and transverse ground structure 950*b*. Ground ring 950 may be similar to ground ring 250 shown in FIG. 2 and may have any of the features of ground ring 650 shown in FIGS. 6A-6B. Outer ground ring 950*a* and transverse ground structure 950*b* may have rectangular ports, circular ports, or ports of other geometric shapes.

Electrocrushing drill bit 914 may be capable of electrically controlled directional drilling. One group of electrodes 908 within one segment formed by transverse ground structure 950*b* may fire at a higher repetition rate than the other groups of electrodes 908. Electrocrushing drill bit 914 may turn towards electrodes 908 firing at a slow repetition rate. In this manner, electrocrushing drill bit 914 may be used to electrically steer the drill during drilling operations by independently controlling the repetition rate of groups of electrodes 908.

Figure 10:
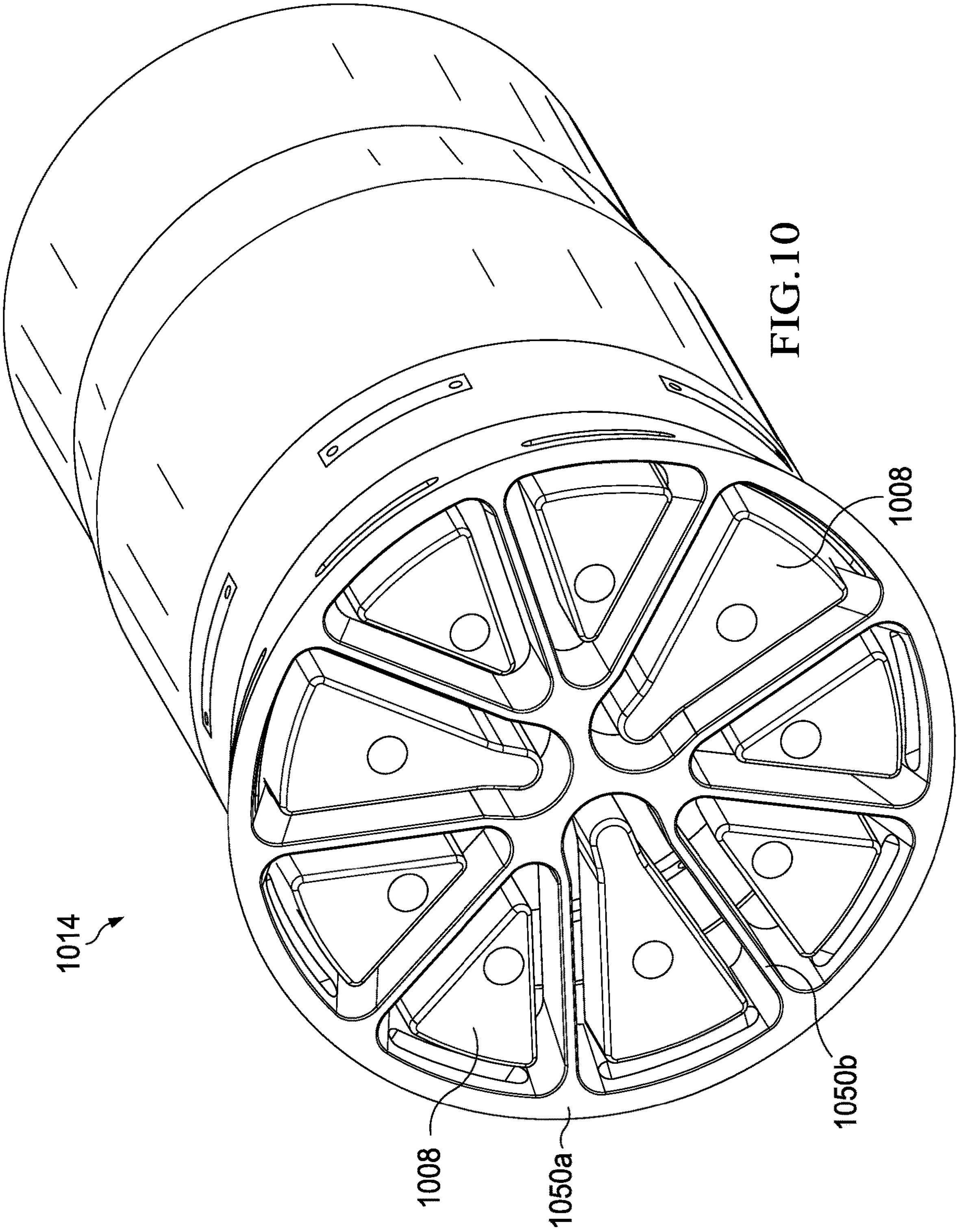
FIG. 10 is a perspective view of an electrocrushing drill bit including multiple electrodes, an outer ground ring, and an intermediate ground ring traversing the outer ground ring to divide the electrocrushing drill bit into nine regions.

FIG. 10 is a perspective view of an electrocrushing drill bit including multiple electrodes, an outer ground ring, and an intermediate ground ring traversing the outer ground ring to divide the electrocrushing drill bit into nine regions. Each of the nine regions enclose wedge-shaped electrode 1008. Electrocrushing drill bit 1014 may include multiple electrodes 1008. Electrodes 1008 may be arranged into groups. For example, electrocrushing drill bit 1014 includes three groups of three electrodes 1008 each within each of nine segments formed by transverse ground ring 1050. Each of electrodes 1008 may have the same shape or may have different shapes as shown in FIG. 10. In FIG. 10, electrodes 1008 are shown as wedge-shaped such that electrodes 1008 fit within the wedge-shaped segments formed by transverse ground structure 1050*b*. Alternatively, electrodes 1008 may be elliptical shaped or a combination of curved and straight lines to fit within the segments formed by transverse ground structure 1050*b*. Electrodes 1008 may have different voltages applied to different groups of electrodes at different times to provide drilling function. For example, ground ring 1050*a* and transverse ground structure 1050*b* may be at ground potential and electrodes 1008 may have a peak voltage of approximately 150 kV. While FIG. 10 shows a multi-electrode configuration consisting of nine segments and nine electrodes 1008, electrocrushing drill bit 1014 may have a configuration that consists of six electrodes, eight electrodes, twelve electrodes or some other number of electrodes 1008 according to the parameters of the drilling operation.

Electrocrushing drill bit 1014 may additionally include transverse ground structure 1050*b* integral with or separate from outer ground ring 1050*a*. Outer ground ring 1050*a* may be similar to ground ring 250 shown in FIG. 2 and may have any of the features of ground ring 650 shown in FIGS. 6A-6B. Outer ground ring 1050*a* and transverse ground ring 1050*b* may have rectangular ports, circular ports, or ports of other geometric shapes between segments.

Electrocrushing drill bit 1014 may be capable of electrically controlled directional drilling. One group of electrodes 1008 within one group of segments formed by transverse ground structure 1050*b* may fire at a higher repetition rate than the other groups of electrodes 1008. Electrocrushing drill bit 1014 may turn towards electrodes 1008 firing at a slow repetition rate. In this manner, electrocrushing drill bit 1014 may be used to electrically steer the drill during drilling operations by independently controlling the repetition rate of groups of electrodes 1008.

Figure 11:
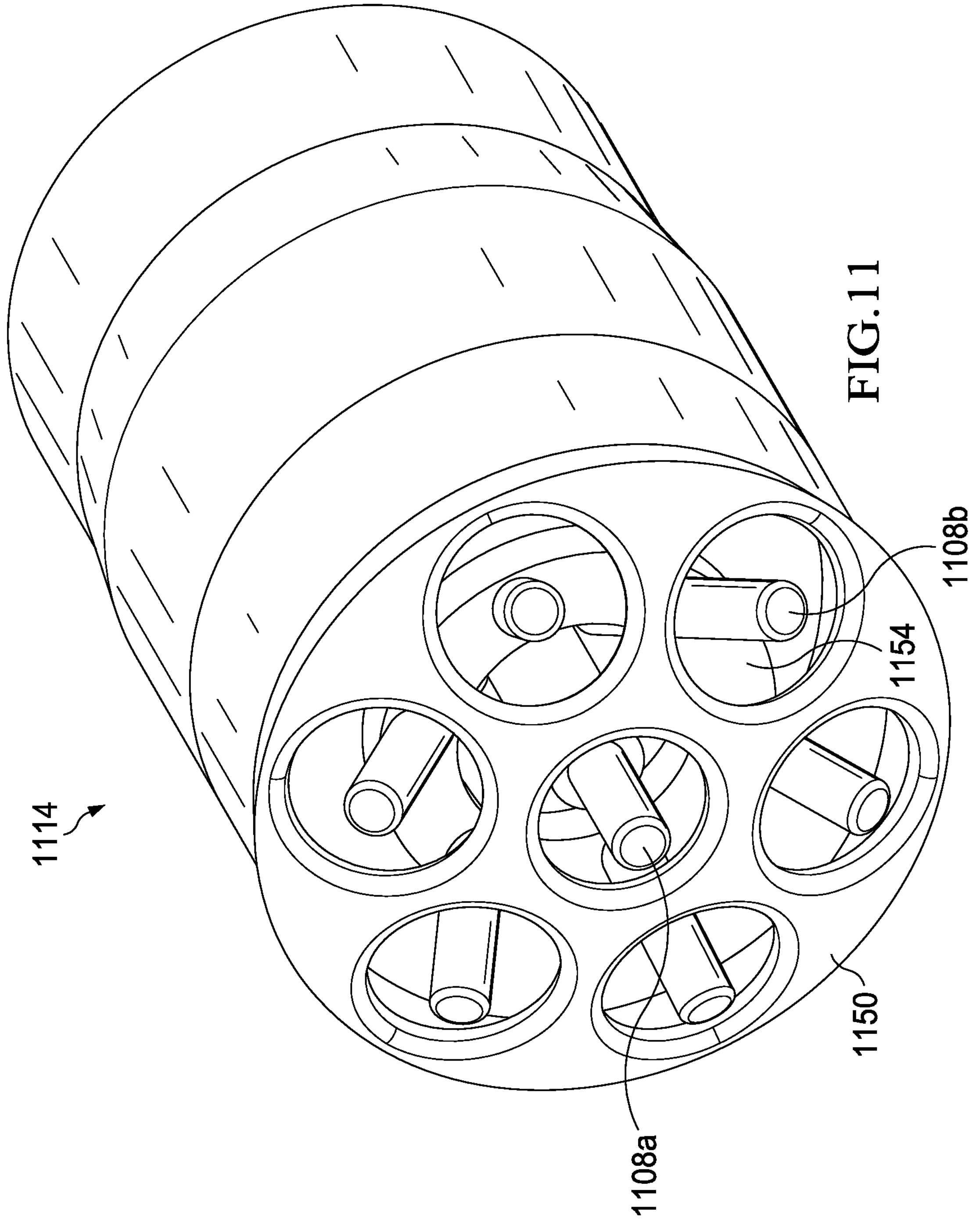
FIG. 11 is a perspective view of an electrocrushing drill bit including multiple electrodes located within openings in a ground ring structure.

FIG. 11 is a perspective view of an electrocrushing drill bit including multiple electrodes located within openings in a ground ring structure. Electrocrushing drill bit 1114 may include multiple electrodes 1108. Electrodes 1108*b* may each be located within a port in ground ring structure 1150. Each of electrodes 1108 may have the same shape, as shown in FIG. 11, or may have different shapes. Electrodes 1108 may be similar to electrodes 808 or 708, shown in FIGS. 7 and 8 and may have any of the features of electrodes 308, 408, and/or 508, shown in FIGS. 3A-5B, such as notches, dimples, serration, or other discontinuities. For example, while electrodes 1108 are shown as rod-shaped in FIG. 11, electrodes 1108 may be conical shaped. Electrodes 1108 may have different voltages applied to different groups of electrodes at different times to provide directional drilling function. For example, ground ring structure 1150 may be at ground potential and electrodes 1108 may have a peak voltage of approximately 150 kV. While FIG. 11 shows a multi-electrode configuration consisting of seven electrodes 1108 within ground ring structure 1150, electrocrushing drill bit 1114 may have a configuration that consists of four electrodes, ten electrodes, or some other number of electrodes 1108 according to the parameters of the drilling operation.

Electrocrushing drill bit 1114 may additionally include ground ring structure 1150 that may be flat and perpendicular to the direction of travel of electrocrushing drill bit 1114. Ground ring structure 1150 may also include curved portions, as shown in FIG. 11, to use electrocrushing drill bit 1114 during directional drilling.

Electrocrushing drill bit 1114 may be capable of electrically controlled directional drilling. One or more electrodes 1108 may fire at a higher repetition rate than the other electrodes 1108. Electrocrushing drill bit 1114 may turn towards electrodes 1108 firing at a slow repetition rate. In this manner, electrocrushing drill bit 1114 may be used to electrically steer the drill during drilling operations by independently controlling the repetition rate of groups of electrodes 1108.

Figure 12:
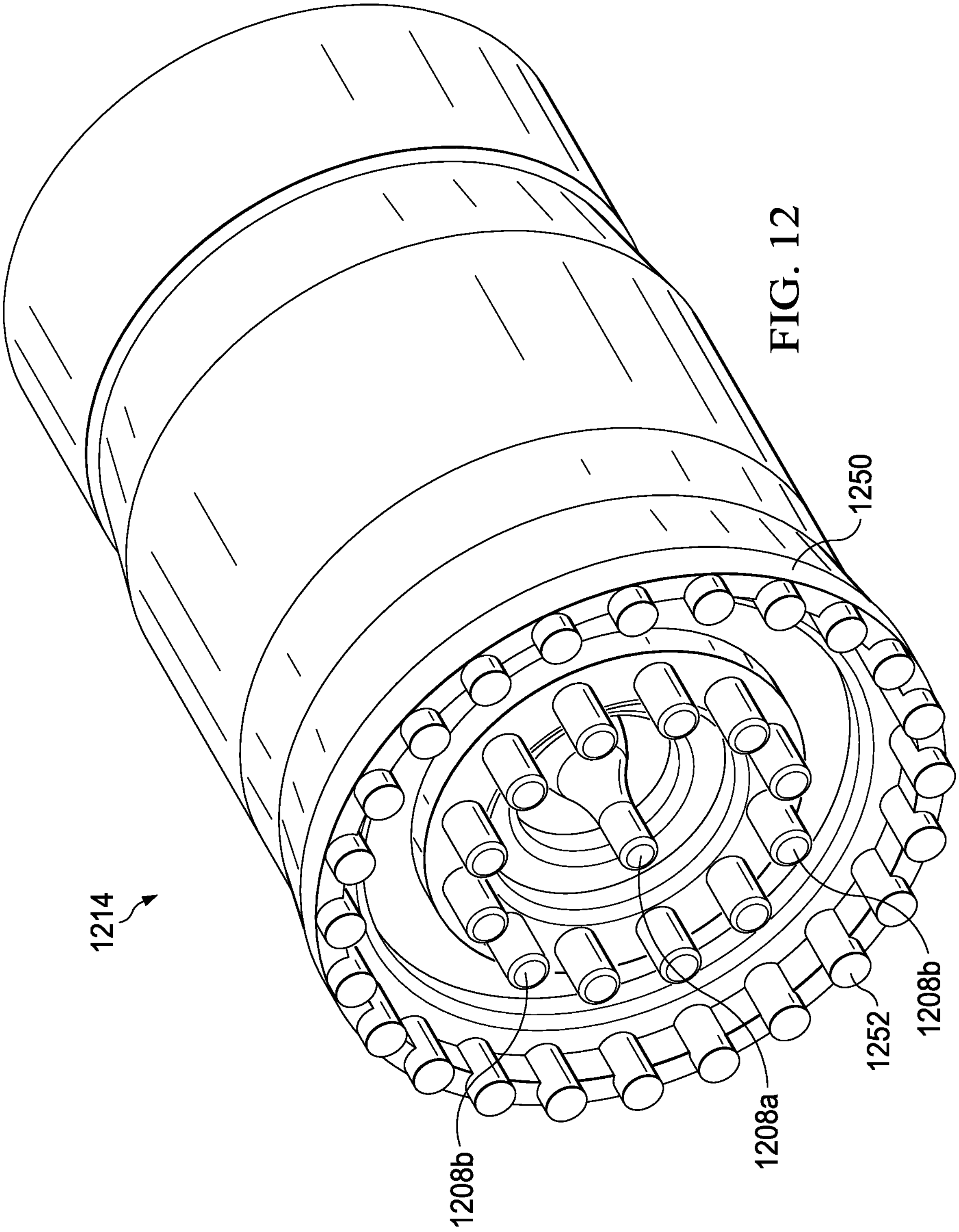
FIG. 12 is a perspective view of an electrocrushing drill bit including multiple electrodes arranged in rows, a central electrode, and a ground ring.

FIG. 12 is a perspective view of an electrocrushing drill bit including multiple electrodes arranged in rows, a central electrode, and a ground ring. Electrocrushing drill bit 1214 may include multiple electrodes 1208*b* arranged in a row and central electrode 1208*a*. Electrodes 1208 may be similar to electrode 708, shown in FIG. 7 and may have any of the features of electrodes 308, 408, and/or 508, shown in FIGS. 3A-5B, such as notches, dimples, serration, or other discontinuities. For example, while electrodes 1208 are shown as rod-shaped in FIG. 12, electrodes 1208 may be conical shaped. Electrodes 1208 may be shaped to facilitate fluid flow, including a tapered or airfoil shape. Electrodes 1208 may have different voltages applied to different sets of electrodes 1208. For example, outer ground ring 1250, and center electrode 1208*a* may be at ground potential and electrodes 1208*b* may have a peak voltage of approximately 150 kV.

Electrocrushing drill bit 1214 may additionally include ground ring 1250. Ground ring 1250 may be similar to ground ring 250 shown in FIG. 2 and may have any of the features of ground ring 650 shown in FIGS. 6A-6B. Ground ring 1250 may have one or more projection 1252 built into the ground ring 1250 as shown in FIG. 12. Projections 1252 might be cylindrical, as shown in FIG. 12, or square shaped, or triangular, or any other suitable shape that provides control of the drilling rate.

Electrocrushing drill bit 1214 may be capable of electrically controlled directional drilling. One or more electrodes 1208 in FIG. 12 may be electrically connected and may fire at a higher repetition rate than the other electrodes 1208. Electrocrushing drill bit 1214 may turn towards electrodes 1208 firing at a slow repetition rate. In this manner, electrocrushing drill bit 1214 may be used to electrically steer the drill during drilling operations by independently controlling the repetition rate of groups of electrodes 1208.

Figure 13:
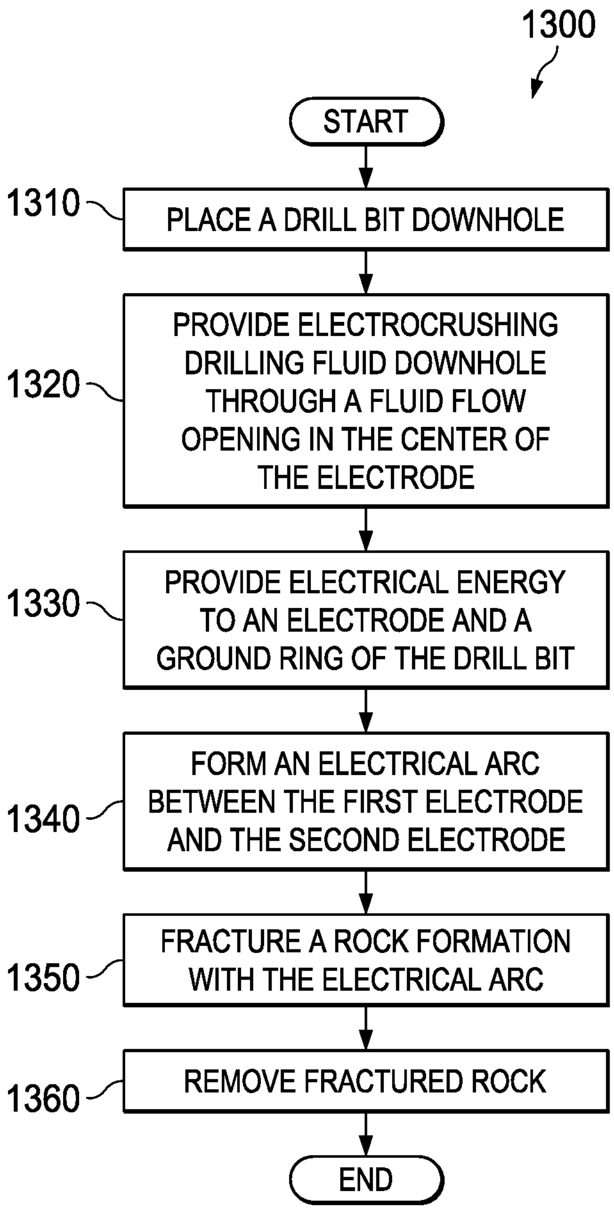
FIG. 13 is a flow chart of exemplary method for drilling a wellbore.

FIG. 13 is a flow chart of exemplary method for drilling a wellbore. Method 1300 may begin and at step 1310 a drill bit may be placed downhole in a wellbore. For example, drill bit 114 may be placed downhole in wellbore 116 as shown in FIG. 1.

At step 1320, electrocrushing drilling fluid may be provided to the downhole drilling field through a fluid flow opening in the center of the electrode, along with fluid flow over the top of the electrode. For example, as described above with reference to FIG. 3, an electrode may include a fluid flow opening in approximately the center of the electrode. Electrocrushing drilling fluid may flow from the drill sting out of the fluid flow opening and into the drilling area. Once in the drilling area, the flow of the electrocrushing drilling fluid may be directed by one or more slots on the face of the electrode.

At step 1330, electrical energy may be provided to an electrode and a ground ring of the drill bit. For example, as described above with reference to FIGS. 1 and 2, a pulse-generating circuit may be implemented within pulsed-power tool 230 of FIG. 2. And as described above with reference to FIG. 2, pulsed-power tool 230 may receive electrical power from a power source on the surface, from a power source located downhole, or from a combination of a power source on the surface and a power source located downhole. The electrical power may be provided to the pulse-generating circuit within pulse-power tool 230. The pulse generating circuit may be coupled to an electrode (such as electrode 208 shown in FIG. 2) and a ground ring (such as ground ring 250 or 650 shown in FIGS. 2 and 6, respectively) of drill bit 114.

At step 1340, an electrical arc may be formed between the first electrode and the second electrode of the drill bit. The pulse-generating circuit may be utilized to repeatedly apply a high electric potential, for example up to or exceeding approximately 150 kV, across the electrode. Each application of electric potential may be referred to as a pulse. When the electric potential across the electrode and ground ring is increased enough during a pulse to generate a sufficiently high electric field, an electrical arc forms through a rock formation at the bottom of the wellbore. The arc may initiate at a portion of the electrode having a sharp radius of curvature and terminate on a portion of the ground ring having a sharp radius of curvature, or vice versa such that the arc initiates on a portion of the ground ring having a sharp radius of curvature and terminate on a portion of the electrode having a sharp radius of curvature. The arc temporarily forms an electrical coupling between the electrode and the ground ring, allowing electric current to flow through the arc inside a portion of the rock formation at the bottom of the wellbore.

At step 1350, the rock formation at an end of the wellbore may be fractured by the electrical arc. For example, as described above with reference to FIGS. 1 and 2, the arc greatly increases the temperature of the portion of the rock formation through which the arc flows as well as the surrounding formation and materials. The temperature is sufficiently high to vaporize any water or other fluids that may be touching or near the arc and may also vaporize part of the rock formation itself. The vaporization process creates a high-pressure gas which expands and, in turn, fractures the surrounding rock.

At step 1360, fractured rock may be removed from the end of the wellbore. For example, as described above with reference to FIG. 1, electrocrushing drilling fluid 122 may move the fractured rock away from the electrode and uphole away from the bottom of wellbore 116. The steps of method 1300 may be repeated until the wellbore has been drilled or the drill bit needs to be replaced. Subsequently, method 1300 may end.

Modifications, additions, or omissions may be made to method 1300 without departing from the scope of the disclosure. For example, the order of the steps may be performed in a different manner than that described and some steps may be performed at the same time. Additionally, each individual step may include additional steps without departing from the scope of the present disclosure.

Embodiments herein may include:

A electrocrushing drill bit including a bit body; an electrode coupled to a power source and the bit body, the electrode having a distal portion for engaging with a surface of a wellbore; a ground ring coupled to the bit body proximate to the electrode and having a distal portion for engaging with the surface of the wellbore, the electrode and the ground ring positioned in relation to each other such that an electric field produced by a voltage applied between the ground ring and the electrode is enhanced at a portion of the electrode proximate to the distal portion of the electrode and at a portion of the ground ring proximate to the distal portion of the ground ring; and an insulator coupled to the bit body between the electrode and the ground ring.

A downhole drilling system including a drill string; a power source; and a drill bit coupled to the drill string and the power source. The drill bit includes a bit body; an electrode coupled to a power source and the bit body, the electrode having a distal portion for engaging with a surface of the wellbore; a ground ring coupled to the bit body proximate to the electrode and having a distal portion for engaging with the surface of the wellbore, the electrode and the ground ring positioned in relation to each other such that an electric field produced by a voltage applied between the ground ring and the electrode is enhanced at a portion of the electrode proximate to the distal portion of the electrode and at a portion of the ground ring proximate to the distal portion of the ground ring; and an insulator coupled to the bit body between the electrode and the ground ring.

A method including placing a drill bit downhole in a wellbore; supporting the weight of the drill bit and a drill string with a drill string support; providing electrical energy to the drill bit; providing electrocrushing drilling fluid to the drill bit; forming an electrical arc between the portion of the electrode proximate to the distal portion of the electrode and the portion of the ground ring proximate to the distal portion of the ground ring of the drill bit; fracturing a rock formation at an end of the wellbore with the electrical arc; and removing fractured rock from the end of the wellbore with the electrocrushing drilling fluid. The drill bit includes a bit body; an electrode coupled to a power source and the bit body, the electrode having a distal portion for engaging with a surface of a wellbore; a ground ring coupled to the bit body proximate to the electrode and having a distal portion for engaging with the surface of the wellbore, the electrode and the ground ring positioned in relation to each other such that an electric field produced by a voltage applied between the ground ring and the electrode is enhanced at a portion of the electrode proximate to the distal portion of the electrode and at a portion of the ground ring proximate to the distal portion of the ground ring; and an insulator coupled to the bit body between the electrode and the ground ring.

Each of embodiments A, B, and C may have one or more of the following additional elements in any combination: Element 1: wherein the electrode further includes a stem adjacent to the body and an opening extending through the stem and the body to the face of the electrode. Element 2:

wherein the electrode further includes a slot in the face of the electrode. Element 3: wherein the slot is a channel in the face of the electrode. Element 4: wherein the slot extends through the body of the electrode. Element 5: wherein the edge of the face of the electrode includes a notch. Element 6: wherein the electrode further includes a stem adjacent to the body and a spring extending through a center of the stem to the body of the electrode. Element 7: wherein the electrode further includes a stem; and a transition between the body and the stem of the electrode has a gentle radius of curvature. Element 8: wherein the ground ring further includes a fluid flow port. Element 9: wherein an edge of the fluid flow port on the ground ring has a gentle radius of curvature. Element 10: wherein the electrode further includes a stem; and the electrocrushing drilling fluid is provided to the drill bit via a fluid flow opening extending through the stem to the face of the generally conical shaped electrode. Element 11: wherein a flow of the electrocrushing drilling fluid is modified by a slot in a face of the electrode. Element 12: wherein the electric arc initiates on the distal portion of the electrode and terminates on the distal portion of the ground ring. Element 13: wherein the electric arc initiates on the distal portion of the ground ring and terminates on the distal portion of the electrode. Element 14: further comprising maintaining contact between the face of the electrode and the rock formation by compressing a spring extending through a center of a stem adjacent to the body of the electrode. Element 15: wherein an edge of the electrode has a first sharp radius of curvature and the distal portion of the ground ring has a second sharp radius of curvature, the first sharp radius of curvature and the second sharp radius of curvature have a radius of between approximately 0.05 inches and approximately 0.15 inches. Element 16: further comprising a drill string support coupled to the bit body. Element 17: wherein the ground ring is the drill string support. Element 18: wherein the ground ring includes a projection extending from the ground ring. Element 19: wherein the ground ring includes an outer ground ring and a transverse ground structure. Element 20: wherein the ground ring includes multiple ground rings. Element 21: wherein the electrode includes a plurality of electrodes. Element 22: wherein the plurality of electrodes are arranged in a circular pattern on the bit body. Element 23: wherein the electrode has a shape selected from the group consisting of conical, cylindrical, rod, triangular, elliptical, wedge, taper, and airfoil. Element 24: wherein providing electrical energy to the drill bit includes providing electrical energy to a subset of the plurality of electrodes at a higher repetition rate than another subset of the plurality of electrodes. Element 25: wherein the electrode further includes a stem adjacent to the body and a piston positioned within a center of the stem to the body of the electrode.

Although the present disclosure has been described with several embodiments, various changes and modifications may be suggested to one skilled in the art. It is intended that the present disclosure encompasses such various changes and modifications as falling within the scope of the appended claims.

What is claimed is:

1. An electrocrushing drill bit, comprising:
- a bit body;
- at least one electrode coupled to a power source and the bit body, the at least one electrode having a distal portion for engaging with a surface of a wellbore, wherein the at least one electrode further comprises a slot in a face of the at least one electrode; and
- a ground structure coupled to the bit body proximate to the at least one electrode and having a distal portion for engaging with the surface of the wellbore, wherein the ground structure comprises a transverse ground structure.

2. The electrocrushing drill bit of claim 1, further comprising:
- an insulator coupled to the bit body between the at least one electrode and the ground structure.

3. The electrocrushing drill bit of claim 1, wherein the ground structure comprises an outer ground ring.

4. The electrocrushing drill bit of claim 3, wherein at least one of the outer ground ring and the transverse ground structure comprises at least one fluid flow port.

5. The electrocrushing drill bit of claim 1, wherein the transverse ground structure comprises at least three segments.

6. The electrocrushing drill bit of claim 5, wherein the at least one electrode comprises at least one electrode positioned between two segments of the at least three segments.

7. The electrocrushing drill bit of claim 6, wherein a voltage is applied at a different repetition rate to the at least one electrode positioned between two segments in comparison to other electrodes positioned between other segments.

8. The electrocrushing drill bit of claim 6, wherein a voltage applied to the at least one electrode positioned between two segments is at a different level in comparison to a voltage to other electrodes positioned between other segments.

9. The electrocrushing drill bit of claim 6, wherein each of the at least one electrode positioned between two segments comprises a wedged-shape electrode.

10. The electrocrushing drill bit of claim 6, wherein each of the at least one electrode positioned between two segments comprises an elliptical-shape electrode.

11. The electrocrushing drill bit of claim 6, wherein the at least one electrode comprises multiple groups of electrodes such that each group of the multiple groups of the electrodes is positioned between two segments of the at least three segments.

12. The electrocrushing drill bit of claim 11, wherein a voltage is applied at a different repetition rate to at least one group of the multiple groups of the electrodes in comparison to others of the multiple electrodes.

13. The electrocrushing drill bit of claim 11, wherein a voltage applied to at least one group of the multiple groups of the electrodes is at a different level in comparison to a voltage to others of the multiple electrodes.

14. The electrocrushing drill bit of claim 1, wherein the at least one electrode and the ground structure is positioned in relation to each other such that an electric field produced by a voltage applied between the ground structure and the at least one electrode is increased at a portion of the at least one electrode proximate to the distal portion of the electrode and at a portion of the ground structure proximate to the distal portion of the ground ring.

15. A downhole drilling system comprising:
- a drill string;
- a power source; and
- a drill bit coupled to the drill string and the power source, the drill bit comprising, a bit body;
  - at least one electrode coupled to the power source and the bit body, the at least one electrode having a distal portion for engaging with a surface of a wellbore, wherein the at least one electrode further comprises a slot in a face of the at least one electrode; and a ground structure coupled to the bit body proximate to the at least one electrode and having a distal portion for engaging with the surface of the wellbore, wherein the ground structure comprises a transverse ground structure.

16. The downhole drilling system of claim 15, further comprising:

an insulator coupled to the bit body between the at least one electrode and the ground structure.

17. The downhole drilling system of claim 15, wherein the ground structure comprises an outer ground ring.

18. The downhole drilling system of claim 17, wherein at least one of the outer ground ring and the transverse ground structure comprises at least one fluid flow port.

19. The downhole drilling system of claim 15, wherein the transverse ground structure comprises at least three segments.

20. The downhole drilling system of claim 19, wherein the at least one electrode comprises at least one electrode positioned between two segments of the at least three segments.

21. The downhole drilling system of claim 20, wherein a voltage is applied at a different repetition rate to the at least one electrode positioned between two segments in comparison to other electrodes positioned between other segments.

22. The downhole drilling system of claim 21, wherein a voltage applied to the at least one electrode positioned between two segments is at a different level in comparison to a voltage to other electrodes positioned between other segments.

23. The downhole drilling system of claim 21, wherein each of the at least one electrode positioned between two segments comprises a wedged-shape electrode.

24. The downhole drilling system of claim 21, wherein each of the at least one electrode positioned between two segments comprises an elliptical-shape electrode.

25. The downhole drilling system of claim 21, wherein the at least one electrode comprises multiple groups of electrodes such that each group of the multiple groups of the electrodes is positioned between two segments of the at least three segments.

26. The downhole drilling system of claim 25, wherein a voltage is applied at a different repetition rate to at least one group of the multiple groups of the electrodes in comparison to others of the multiple electrodes.

27. The downhole drilling system of claim 25, wherein a voltage applied to at least one group of the multiple groups of the electrodes is at a different level in comparison to a voltage to others of the multiple electrodes.

28. A method comprising:

deploying a drill bit downhole in a wellbore, the drill bit comprising, a bit body;

at least one electrode coupled to a power source and the bit body, the at least one electrode having a distal portion for engaging with a surface of the wellbore, wherein the at least one electrode further comprises a slot in a face of the at least one electrode; and a ground structure coupled to the bit body proximate to the at least one electrode and having a distal portion for engaging with the surface of the wellbore, wherein the ground structure comprises a transverse ground structure;

supplying an electrical energy to the drill bit;

supplying an electrocrushing drilling fluid to the drill bit;

forming an electrical arc between the portion of the at least one electrode proximate to the distal portion of the at least one electrode and the portion of the ground structure proximate to the distal portion of the ground structure of the drill bit;

fracturing a rock formation at an end of the wellbore with the electrical arc; and removing fractured rock from the end of the wellbore with the electrocrushing drilling fluid.

29. The method of claim 28, wherein the drill bit comprises an insulator coupled to the bit body between the at least one electrode and the ground structure.

30. The method of claim 28, wherein the ground structure comprises an outer ground ring.

31. The method of claim 30, wherein at least one of the outer ground ring and the transverse ground structure comprises at least one fluid flow port.

32. The method of claim 30, wherein the transverse ground structure comprises at least three segments.

33. The method of claim 32, wherein the at least one electrode comprises at least one electrode positioned between two segments of the at least three segments.

34. The method of claim 33, wherein a voltage is applied at a different repetition rate to the at least one electrode positioned between two segments in comparison to other electrodes positioned between other segments.

35. The method of claim 33, wherein a voltage applied to the at least one electrode positioned between two segments is at a different level in comparison to a voltage to other electrodes positioned between other segments.

36. The method of claim 33, wherein each of the at least one electrode positioned between two segments comprises a wedged-shape electrode.

37. The method of claim 33, wherein each of the at least one electrode positioned between two segments comprises an elliptical-shape electrode.

38. The method of claim 33, wherein the at least one electrode comprises multiple groups of electrodes such that each group of the multiple groups of the electrodes is positioned between two segments of the at least three segments.

39. The method of claim 38, wherein a voltage is applied at a different repetition rate to at least one group of the multiple groups of the electrodes in comparison to others of the multiple electrodes.

40. The method of claim 38, wherein a voltage applied to at least one group of the multiple groups of the electrodes is at a different level in comparison to a voltage to others of the multiple electrodes.

41. The method of claim 28, wherein the at least one electrode and the ground structure positioned in relation to each other such that an electric field produced by a voltage applied between the ground structure and the at least one electrode is increased at a portion of the at least one electrode proximate to the distal portion of the electrode and at a portion of the ground structure proximate to the distal portion of the ground ring.

* * * * *